United States Patent
Wang et al.

(10) Patent No.: US 10,375,598 B2
(45) Date of Patent: *Aug. 6, 2019

(54) TRAFFIC CONTROL METHOD AND APPARATUS

(71) Applicant: HUAWEI TECHNOLOGIES CO., LTD., Shenzhen, Guangdong (CN)

(72) Inventors: Yahui Wang, Beijing (CN); Guiming Shu, Shenzhen (CN); Wenmei Gao, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/038,510

(22) Filed: Jul. 18, 2018

(65) Prior Publication Data

US 2018/0324628 A1 Nov. 8, 2018

Related U.S. Application Data

(63) Continuation of application No. 15/442,356, filed on Feb. 24, 2017, now Pat. No. 10,045,284, which is a (Continued)

(30) Foreign Application Priority Data

May 26, 2014 (WO) ................ PCT/CN2014/078431

(51) Int. Cl.
H04B 5/00 (2006.01)
H04W 28/02 (2009.01)
(Continued)

(52) U.S. Cl.
CPC ......... *H04W 28/0215* (2013.01); *H04W 4/80* (2018.02); *H04W 28/0247* (2013.01);
(Continued)

(58) Field of Classification Search
CPC ... H04W 4/80; H04W 28/0215; H04W 84/12; H04W 76/10; H04W 80/04; H04W 28/0247; H04W 68/005; H04W 88/02
See application file for complete search history.

(56) References Cited

U.S. PATENT DOCUMENTS 7,907,945 B2 3/2011 Deprun
9,288,740 B2* 3/2016 Sato ................ H04W 4/80
(Continued)

FOREIGN PATENT DOCUMENTS

CN 102325349 A 1/2012
CN 102711093 A 10/2012
(Continued)

OTHER PUBLICATIONS

Pu Chen:[Discussion] Do I need to restrict the traffic of portable WLAN hotspots? From https://club.huawei.com/thread-743261-1-1.html, Publication date: Apr. 23, 2014. total 6 pages. with English translation.

(Continued)

*Primary Examiner* — Nhan T Le
(74) *Attorney, Agent, or Firm* — Huawei Technologies Co., Ltd.

(57) ABSTRACT

A slave device accesses an external network through a master device via a short-range wireless communication channel between the master device and the slave device. The slave device receives a notification message from the master device, wherein the notification message includes information about an intermediate network used by the master device to connect to the external network. The slave device controls its network traffic to the external network according to a type of the intermediate network. When a master device uses a network of a cellular network type, use of network traffic in an application on a slave device can be restricted, thereby saving traffic.

11 Claims, 15 Drawing Sheets

Related U.S. Application Data continuation of application No. 14/860,216, filed on Sep. 21, 2015, now Pat. No. 9,622,105, which is a continuation of application No. PCT/CN2014/095619, filed on Dec. 30, 2014.

(51) Int. Cl.
*H04W 68/00* (2009.01)
*H04W 4/80* (2018.01)
*H04W 76/10* (2018.01)
*H04W 48/16* (2009.01)
*H04W 84/12* (2009.01)
*H04W 80/04* (2009.01)

(52) U.S. Cl.
CPC ......... *H04W 48/16* (2013.01); *H04W 68/005* (2013.01); *H04W 76/10* (2018.02); *H04W 80/04* (2013.01); *H04W 84/12* (2013.01)

(56) References Cited

U.S. PATENT DOCUMENTS

| | | | |
|---|---|---|---|
| 9,602,962 B2 | 3/2017 | Edge et al. | |
| 9,622,105 B2 * | 4/2017 | Wang | H04W 76/10 |
| 10,045,284 B2 * | 8/2018 | Wang | H04W 76/10 |
| 10,085,153 B2 * | 9/2018 | Boettcher | H04W 12/08 |
| 2009/0270120 A1 | 10/2009 | Park | |
| 2010/0087214 A1 | 4/2010 | Bournel et al. | |
| 2010/0150110 A1 | 6/2010 | Dutta et al. | |
| 2012/0257571 A1 | 10/2012 | Liao | |
| 2013/0214909 A1 | 8/2013 | Meijers et al. | |
| 2013/0331028 A1 | 12/2013 | Kuehnel et al. | |
| 2016/0072855 A1 | 3/2016 | Palin et al. | |

FOREIGN PATENT DOCUMENTS

| | | |
|---|---|---|
| CN | 103096384 A | 5/2013 |
| CN | 103096385 A | 5/2013 |
| CN | 103117906 A | 5/2013 |
| CN | 103501333 A | 1/2014 |

OTHER PUBLICATIONS

SA WG2 Meeting #92 S2-123019,"Access Selection not based on SSID",Motorola Mobility, Jul. 9-13, 2012,total 4 pages. XP050633533.

IEEE Std 802.11™-2012,Part 11: Wireless LAN Medium Access Control (MAC) and Physical Layer (PHY) Specifications,LAN/MAN Standards Committee,Mar. 29, 2012,total 2793 pages.

Dan Hulme:"How to block apps on tablet from accessing the internet while on tethering-android enthusiasts stack exchange",Mar. 19, 2014,total 6 pages. XP055264721.

* cited by examiner

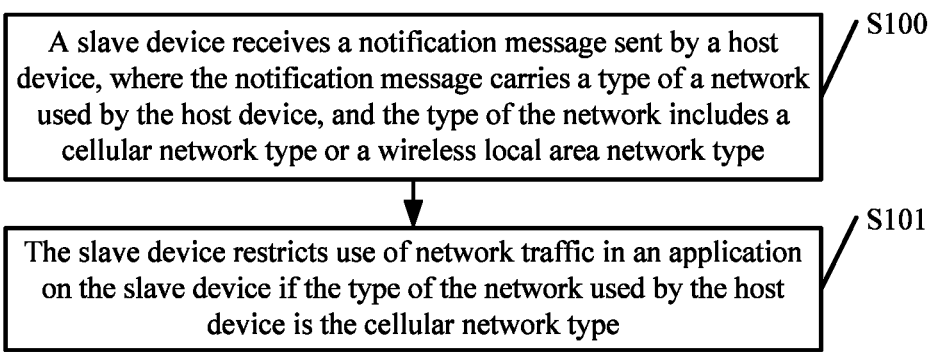
FIG. 1
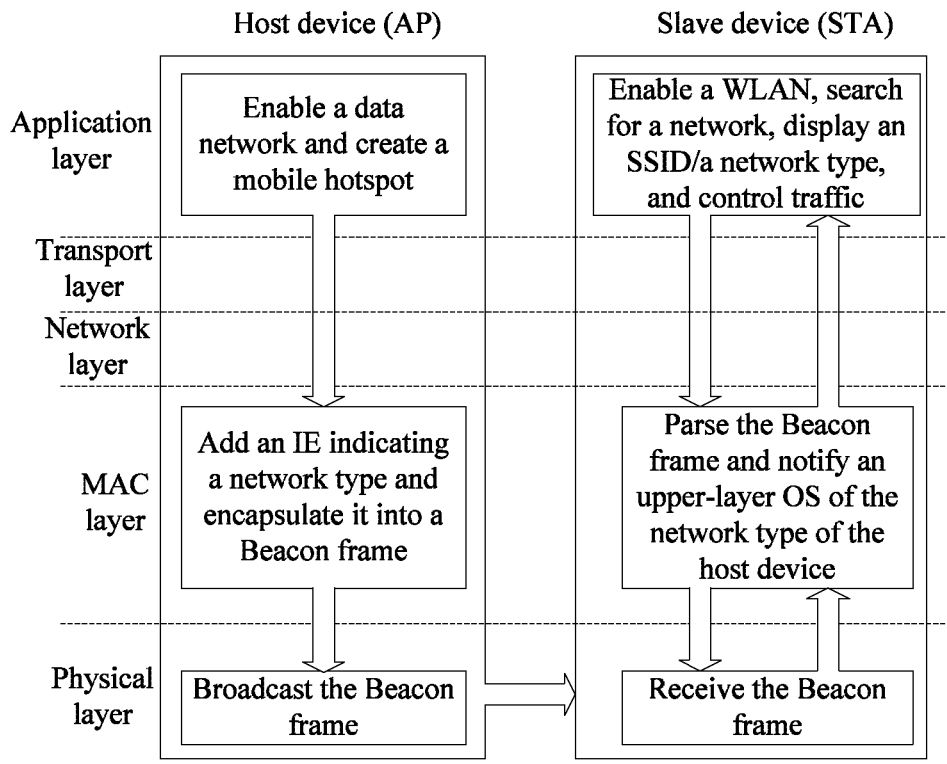
FIG. 1-a

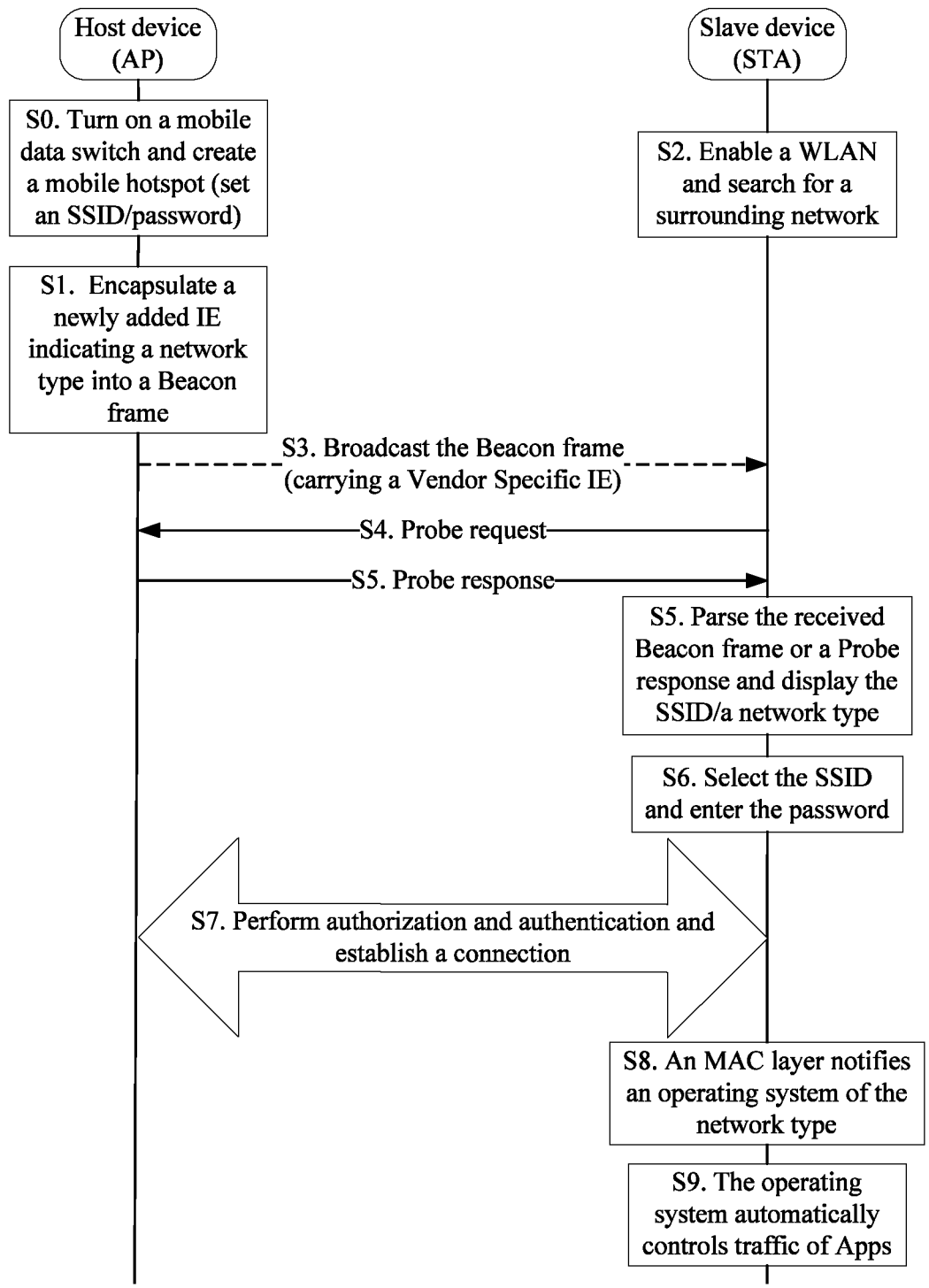
FIG. 1-b

TRAFFIC CONTROL METHOD AND APPARATUS

CROSS-REFERENCE TO RELATED APPLICATIONS

This application is a continuation of U.S. application Ser. No. 15/442,356, filed on Feb. 24, 2017, which is a continuation of U.S. application Ser. No. 14/860,216, filed on Sep. 21, 2015, which is a continuation of International Application No. PCT/CN2014/095619, filed on Dec. 30, 2014, which claims priority to International Application PCT/CN2014/078431, filed on May 26, 2014. All of the aforementioned applications are hereby incorporated by reference in their entirety.

TECHNICAL FIELD

The present invention relates to the field of network technologies, and in particular, to a traffic control method and apparatus.

BACKGROUND

As network technologies develop, an electronic device held by a user accesses the Internet in various manners, for example, accessing the Internet by using a mobile hotspot created by another electronic device. The device creating the mobile hotspot is a master device, and a device accessing the hotspot is a slave device. The master device enables the mobile hotspot and connects to the Internet, while the slave device accesses the Internet by using the mobile hotspot of the master device as an access point. When the master device connects to the Internet by using a cellular network, the slave device accesses the Internet by using data traffic of the master device. In this case, for the slave device, a type of a network used by the slave device is a wireless local area network type. Generally, in the slave device, an application automatically performs, according to the type of the network used by the slave device, an operation corresponding to the type of the network. For example, the slave device does not restrict use of network traffic in an application on the slave device if the type of the network used by the slave device is a wireless local area network type; for example, an application automatically performs a version update, thereby consuming a relatively large amount of network traffic. Therefore, when a type of a network used by the master device is a cellular network type, because the slave device performs an operation corresponding to the wireless local area network type, a large amount of network traffic is wasted without user's realization.

SUMMARY

Embodiments of the present invention provide a traffic control method and apparatus, so that a slave device can restrict use of network traffic in an application on the slave device when a master device uses a network of a cellular network type, thereby saving traffic.

A first aspect of the present invention provides a traffic control method, where the method may include:

receiving, by a slave device, a notification message sent by a master device, where the notification message carries a type of a network used by the master device, and the type of the network includes a cellular network type or a wireless local area network type; and restricting, by the slave device, use of network traffic in an application on the slave device if the type of the network used by the master device is the cellular network type, where the slave device accesses the Internet by using the master device as an access point.

Based on the first aspect, in a first feasible implementation manner, the restricting, by the slave device, use of network traffic in an application on the slave device includes:

disabling, by the slave device, a data connection of a preset application that consumes a relatively large amount of traffic and is in the application on the slave device, thereby disabling Internet access permission of the preset application and reducing use of the network traffic in the application on the slave device; or notifying, by the slave device, all applications on the slave device, where content of the notification includes that the type of the network used by the master device is the cellular network type, so that all the applications on the slave device run according to a preset running manner corresponding to the cellular network type, thereby restricting use of the network traffic in the application on the slave device.

Based on the first feasible implementation manner of the first aspect, in a second feasible implementation manner, before the disabling, by the slave device, a data connection of a preset application that consumes a relatively large amount of traffic and is in the application on the slave device, the method further includes:

downloading, by the slave device, at least one application and recording type information of each of the application; and classifying, by the slave device, the at least one application into at least one category according to the type information of each of the application, and determining that all applications in a preset category are the preset applications.

Based on the first feasible implementation manner of the first aspect, in a third feasible implementation manner, before the disabling, by the slave device, a data connection of a preset application that consumes a relatively large amount of traffic and is in the application on the slave device, the method further includes:

collecting, by the slave device, statistics about traffic used in a unit time by each application in all the applications on the slave device, and determining that an application with traffic used in a unit time exceeding a preset threshold is the preset application.

Based on the first aspect, in a fourth feasible implementation manner, the notification message is a beacon frame, the type of the network used by the master device is encapsulated into a newly added information element of the beacon frame, and the newly added information element is a newly defined information element or is an information element in an existing standard; and after the receiving, by a slave device, a notification message sent by a master device, the method further includes:

acquiring, by the slave device, the newly added information element from the beacon frame; and obtaining, by the slave device by parsing the newly added information element, the type of the network used by the master device.

Based on the first aspect, in a fifth feasible implementation manner, the receiving, by a slave device, a notification message sent by a master device includes:

receiving, by the slave device according to a first preset period, the notification message sent by the master device.

Based on the first aspect, the first feasible implementation manner of the first aspect, the second feasible implementation manner of the first aspect, the third feasible implementation manner of the first aspect, the fourth feasible implementation manner of the first aspect, or the fifth feasible implementation manner of the first aspect, in a sixth feasible implementation manner, after the restricting, by the slave device, use of network traffic in an application on the slave device if the type of the network used by the master device is the cellular network type, the method further includes:

scanning, by the slave device, whether there is another available access point; and if there is another available access point, selecting, by the slave device, an alternative access point from the another access point, where a type of a network used by the alternative access point is the wireless local area network type; and switching, by the slave device, from the access point being the master device to the alternative access point and accessing the Internet by using the alternative access point.

Based on the sixth feasible implementation manner of the first aspect, in a seventh feasible implementation manner, if the alternative access point includes at least two access points, before the switching, by the slave device, from the access point being the master device to the alternative access point and accessing the Internet by using the alternative access point, the method further includes:

comparing, by the slave device, priority sequences of all access points in the alternative access point; and the switching, by the slave device, from the access point being the master device to the alternative access point and accessing the Internet by using the alternative access point includes:

switching, by the slave device, from the access point being the master device to an access point with a highest priority in the alternative access point and accessing the Internet by using the access point with the highest priority.

Based on the seventh feasible implementation manner of the first aspect, in an eighth feasible implementation manner, before the receiving, by a slave device, a notification message sent by a master device, the method further includes:

setting, by the slave device, priority sequences of multiple access points, where the multiple access points include the alternative access point.

Based on the eighth feasible implementation manner of the first aspect, in a ninth feasible implementation manner, the setting, by the slave device, priority sequences of multiple access points includes:

acquiring, by the slave device, priority sequences of all access points in the multiple access points, where the priority sequences are set by a user; or collecting, by the slave device within a preset period of time, statistics about a length of use time for which the slave device uses each access point in the multiple access points, and determining priority sequences of all access points in the multiple access points according to the length of use time of each access point in the multiple access points.

A second aspect of the present invention provides a traffic control method, where the method may include:

acquiring, by a master device, a network type of a currently used network, where the network type includes a cellular network type or a wireless local area network type; and sending, by the master device, a notification message to a slave device, where the notification message carries the network type, so that the slave device restricts use of network traffic in an application on the slave device when the network type is the cellular network type, where the slave device accesses the Internet by using the master device as an access point.

Based on the second aspect, in a first feasible implementation manner, after the acquiring, by a master device, a network type of a currently used network and before the sending, by the master device, a notification message to a slave device, the method further includes:

encapsulating, by the master device, the network type into a newly added information element, where the newly added information element is a newly defined information element or is an information element in an existing standard; and encapsulating, by the master device, the newly added information element into a beacon frame, and determining that the beacon frame is the notification message.

Based on the second aspect, in a second feasible implementation manner, the sending, by the master device, a notification message to a slave device includes:

sending, by the master device, the notification message to the slave device according to a second preset period.

A third aspect of the present invention provides a traffic control slave apparatus, where the apparatus may include:

a receiving module, configured to receive a notification message sent by a master apparatus, where the notification message carries a type of a network used by the master device, and the type of the network includes a cellular network type or a wireless local area network type; and a restricting module, configured to restrict use of network traffic in an application on the slave device if the type of the network used by the master device is the cellular network type, where the slave apparatus accesses the Internet by using the master apparatus as an access point.

Based on the third aspect, in a first feasible implementation manner, the restricting module is specifically configured to: if the type of the network used by the master apparatus is the cellular network type, disable a data connection of a preset application that consumes a relatively large amount of traffic and is in the application on the slave device, thereby disabling Internet access permission of the preset application and reducing use of the network traffic in the application on the slave device; or the restricting module is specifically configured to notify all applications on the slave apparatus, where content of the notification includes that the type of the network used by the master apparatus is the cellular network type, so that all the applications on the slave apparatus run according to a preset running manner corresponding to the cellular network type, thereby restricting use of the network traffic in the application on the slave apparatus.

Based on the first feasible implementation manner of the third aspect, in a second feasible implementation manner, the apparatus further includes:

a downloading module, configured to download at least one application and record type information of each of the application; and a classifying module, configured to: classify the at least one application into at least one category according to the type information of each of the application, and determine that all applications in a preset category are the preset applications.

Based on the first feasible implementation manner of the third aspect, in a third feasible implementation manner, the apparatus further includes:

a statistics collecting module, configured to: collect statistics about traffic used in a unit time by each application in all the applications on the slave device, and determine that an application with traffic used in a unit time exceeding a preset threshold is the preset application.

Based on the third aspect, in a fourth feasible implementation manner, the notification message is a beacon frame, the type of the network used by the master device is encapsulated into a newly added information element of the beacon frame, and the newly added information element is a newly defined information element or is an information element in an existing standard; and the apparatus further includes:

a first acquiring module, configured to acquire the newly added information element from the beacon frame; and a parsing module, configured to obtain, by parsing the newly added information element, the type of the network used by the master device.

Based on the third aspect, in a fifth feasible implementation manner, the receiving module is specifically configured to receive, according to a first preset period, the notification message sent by the master device.

Based on the third aspect, the first feasible implementation manner of the third aspect, the second feasible implementation manner of the third aspect, the third feasible implementation manner of the third aspect, the fourth feasible implementation manner of the third aspect, or the fifth feasible implementation manner of the third aspect, in a sixth feasible implementation manner, the apparatus further includes:

a scanning module, configured to scan whether there is another available access point;

a selecting module, configured to: if there is another available access point, select an alternative access point from the another access point, where a type of a network used by the alternative access point is the wireless local area network type; and a switching module, configured to switch from the access point being the master device to the alternative access point and access the Internet by using the alternative access point.

Based on the sixth feasible implementation manner of the third aspect, in a seventh feasible implementation manner, if the alternative access point includes at least two access points, the apparatus further includes:

a comparing module, configured to compare priority sequences of all access points in the alternative access point; where the switching module is specifically configured to switch from the access point being the master device to an access point with a highest priority in the alternative access point and access the Internet by using the access point with the highest priority.

Based on the seventh feasible implementation manner of the third aspect, in an eighth feasible implementation manner, the apparatus further includes:

a setting module, configured to set priority sequences of multiple access points, where the multiple access points include the alternative access point.

Based on the eighth feasible implementation manner of the third aspect, in a ninth feasible implementation manner, the setting module is specifically configured to acquire priority sequences of all access points in the multiple access points, where the priority sequences are set by a user; or the setting module is specifically configured to: collect, within a preset period of time, statistics about a length of use time for which the slave device uses each access point in the multiple access points, and determine priority sequences of all access points in the multiple access points according to the length of use time of each access point in the multiple access points.

A fourth aspect of the present invention provides a traffic control master apparatus, where the apparatus may include:

a second acquiring module, configured to acquire a network type of a currently used network, where the network type includes a cellular network type or a wireless local area network type; and a sending module, configured to send a notification message to a slave apparatus, where the notification message carries the network type, so that the slave apparatus restricts use of network traffic in an application on the slave apparatus when the network type is the cellular network type, where the slave apparatus accesses the Internet by using the master apparatus as an access point.

Based on the fourth aspect, in a first possible implementation manner, the apparatus further includes:

a first encapsulating module, configured to encapsulate the network type into a newly added information element, where the newly added information element is a newly defined information element or is an information element in an existing standard; and a second encapsulating module, configured to: encapsulate the newly added information element into a beacon frame, and determine that the beacon frame is the notification message.

Based on the fourth aspect, in a second feasible implementation manner, the sending module is specifically configured to send the notification message to the slave device according to a second preset period.

A fifth aspect of the present invention provides a traffic control slave apparatus, where the apparatus may include a receiver and a processor, where:

the receiver is configured to receive a notification message sent by a master apparatus, where the notification message carries a type of a network used by the master device, and the type of the network includes a cellular network type or a wireless local area network type; and the processor is configured to restrict use of network traffic in an application on the slave device if the type of the network used by the master device is the cellular network type, where the slave apparatus accesses the Internet by using the master apparatus as an access point.

Based on the fifth aspect, in a first feasible implementation manner, the processor is further configured to: if the type of the network used by the master apparatus is the cellular network type, disable a data connection of a preset application that consumes a relatively large amount of traffic and is in the application on the slave device, thereby disabling Internet access permission of the preset application and reducing use of the network traffic in the application on the slave device; or the processor is further configured to notify all applications on the slave apparatus, where content of the notification includes that the type of the network used by the master apparatus is the cellular network type, so that all the applications on the slave apparatus run according to a preset running manner corresponding to the cellular network type, thereby restricting use of the network traffic in the application on the slave apparatus.

Based on the first feasible implementation manner of the fifth aspect, in a second feasible implementation manner, the processor is further configured to download at least one application and record type information of each of the application; and the processor is further configured to: classify the at least one application into at least one category according to the type information of each of the application, and determine that all applications in a preset category are the preset applications.

Based on the first feasible implementation manner of the fifth aspect, in a third feasible implementation manner, the processor is further configured to: collect statistics about traffic used in a unit time by each application in all the applications on the slave device, and determine that an application with traffic used in a unit time exceeding a preset threshold is the preset application.

Based on the fifth aspect, in a fourth feasible implementation manner, the notification message is a beacon frame, the type of the network used by the master device is encapsulated into a newly added information element of the beacon frame, and the newly added information element is a newly defined information element or is an information element in an existing standard;

the processor is further configured to acquire the newly added information element from the beacon frame; and the processor is further configured to obtain, by parsing the newly added information element, the type of the network used by the master device.

Based on the fifth aspect, in a fifth feasible implementation manner, the receiver is further configured to receive, according to a first preset period, the notification message sent by the master device.

Based on the fifth aspect, the first feasible implementation manner of the fifth aspect, the second feasible implementation manner of the fifth aspect, the third feasible implementation manner of the fifth aspect, the fourth feasible implementation manner of the fifth aspect, or the fifth feasible implementation manner of the fifth aspect, in a sixth feasible implementation manner, the receiver is further configured to scan whether there is another available access point;

the processor is further configured to: if there is another available access point, select an alternative access point from the another access point, where a type of a network used by the alternative access point is the wireless local area network type; and the processor is further configured to switch from the access point being the master device to the alternative access point and access the Internet by using the alternative access point.

Based on the sixth feasible implementation manner of the fifth aspect, in a seventh feasible implementation manner, if the alternative access point includes at least two access points;

the processor is further configured to compare priority sequences of all access points in the alternative access point; and the processor is further configured to switch from the access point being the master device to an access point with a highest priority in the alternative access point and access the Internet by using the access point with the highest priority.

Based on the seventh feasible implementation manner of the fifth aspect, in an eighth feasible implementation manner, the processor is further configured to set priority sequences of multiple access points, where the multiple access points include the alternative access point.

Based on the eighth feasible implementation manner of the fifth aspect, in a ninth feasible implementation manner, the processor is further configured to acquire priority sequences of all access points in the multiple access points, where the priority sequences are set by a user; or the processor is further configured to: collect, within a preset period of time, statistics about a length of use time for which the slave device uses each access point in the multiple access points, and determine priority sequences of all access points in the multiple access points according to the length of use time of each access point in the multiple access points.

A sixth aspect of the present invention provides a traffic control master apparatus, where the apparatus may include a processor and a transmitter, where:

the processor is configured to acquire a network type of a currently used network, where the network type includes a cellular network type or a wireless local area network type; and the transmitter is configured to send a notification message to a slave apparatus, where the notification message carries the network type, so that the slave apparatus restricts use of network traffic in an application on the slave apparatus when the network type is the cellular network type, where the slave apparatus accesses the Internet by using the master apparatus as an access point.

Based on the sixth aspect, in a first feasible implementation manner, the processor is further configured to encapsulate the network type into a newly added information element, where the newly added information element is a newly defined information element or is an information element in an existing standard; and the processor is further configured to: encapsulate the newly added information element into a beacon frame, and determine that the beacon frame is the notification message.

Based on the sixth aspect, in a second feasible implementation manner, the transmitter is further configured to send the notification message to the slave device according to a second preset period.

A seventh aspect of the present invention provides a traffic control method, including:

receiving, by a slave device, a notification message sent by a master device, where the notification message is used to indicate a type of a network used by the master device to the slave device; and controlling, by the slave device, use of network traffic on the slave device based on the type of the network used by the master device, where the slave device accesses the Internet by using the master device as an access point.

Based on the seventh aspect, in a first feasible implementation manner of the seventh aspect, the notification message includes a device type identifier of the master device; and before the controlling, by the slave device, use of network traffic on the slave device based on the type of the network used by the master device, the method further includes:

obtaining, by the slave device according to the device type identifier of the master device, the type of the network used by the master device.

Based on the seventh aspect or the first feasible implementation manner of the seventh aspect, in a second feasible implementation manner of the seventh aspect, the type of the network includes a cellular network type or a wireless local area network type.

Based on the second feasible implementation manner of the seventh aspect, in a third feasible implementation manner of the seventh aspect, the controlling, by the slave device, use of network traffic on the slave device based on the type of the network used by the master device includes:

if the type of the network used by the master device is the cellular network type, changing, by the slave device, an identifier parameter used to represent the type of the network used by the master device to an identifier parameter used to represent the cellular network type, so that an application on the slave device acquires the identifier parameter and runs based on the identifier parameter and according to a preset running manner corresponding to the cellular network type, thereby controlling the use of network traffic in the application on the slave device.

An eighth aspect of the present invention provides a traffic control slave apparatus, including: a receiving module, configured to receive a notification message sent by a master device, where the notification message is used to indicate a type of a network used by the master device to the slave device; and a control module, configured to control use of network traffic on the slave device based on the type of the network used by the master device, where the slave device accesses the Internet by using the master device as an access point.

Based on the eighth aspect, in a first feasible implementation manner of the eighth aspect, the notification message includes a device type identifier of the master device; and the apparatus further includes:

an acquiring module, configured to obtain, according to the device type identifier of the master device, the type of the network used by the master device.

Based on the eighth aspect or the first feasible implementation manner of the eighth aspect, in a second feasible implementation manner of the eighth aspect, the type of the network includes a cellular network type or a wireless local area network type.

Based on the second feasible implementation manner of the eighth aspect, in a third feasible implementation manner of the eighth aspect, the control module is specifically configured to: if the type of the network used by the master device is the cellular network type, change an identifier parameter used to represent the type of the network used by the master device to an identifier parameter used to represent the cellular network type, so that an application on the slave device acquires the identifier parameter and runs based on the identifier parameter and according to a preset running manner corresponding to the cellular network type, thereby controlling the use of network traffic in the application on the slave device.

A ninth aspect of the present invention provides a traffic control slave apparatus, including:

a receiver, configured to receive a notification message sent by a master device, where the notification message is used to indicate a type of a network used by the master device to the slave device; and a processor, configured to control use of network traffic on the slave device based on the type of the network used by the master device, where the slave device accesses the Internet by using the master device as an access point.

Based on the ninth aspect, in a first feasible implementation manner of the ninth aspect, the notification message includes a device type identifier of the master device; and the processor is further configured to obtain, according to the device type identifier of the master device, the type of the network used by the master device.

Based on the ninth aspect or the first feasible implementation manner of the ninth aspect, in a second feasible implementation manner of the ninth aspect, the type of the network includes a cellular network type or a wireless local area network type.

Based on the second feasible implementation manner of the ninth aspect, in a third feasible implementation manner of the ninth aspect, the controlling use of network traffic on the slave device based on the type of the network used by the master device includes:

if the type of the network used by the master device is the cellular network type, changing an identifier parameter used to represent the type of the network used by the master device to an identifier parameter used to represent the cellular network type, so that an application on the slave device acquires the identifier parameter and runs based on the identifier parameter and according to a preset running manner corresponding to the cellular network type, thereby controlling the use of network traffic in the application on the slave device.

In the embodiments of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

BRIEF DESCRIPTION OF DRAWINGS

To describe the technical solutions in the embodiments of the present invention more clearly, the following briefly introduces the accompanying drawings required for describing the embodiments.

FIG. 1 is a schematic flowchart of a traffic control method according to the present invention;

FIG. 1-*a* is a block diagram of a traffic control system according to the present invention;

FIG. 1-*b* is a flowchart of information exchange between a master device and a slave device according to the present invention;

DESCRIPTION OF EMBODIMENTS

Figure 2:
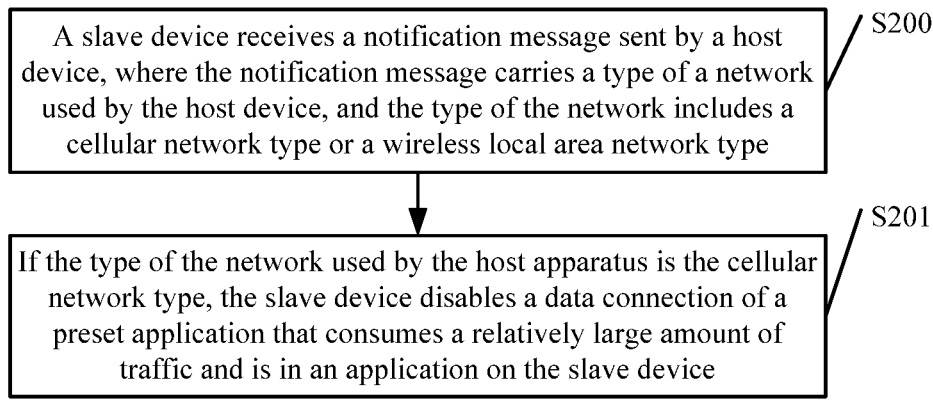
FIG. 2 is a schematic flowchart of another traffic control method according to the present invention.

The following clearly describes the technical solutions in the embodiments of the present invention with reference to the accompanying drawings in the embodiments of the present invention.

In the embodiments of the present invention, a slave device may be a mobile phone, a tablet personal computer (Tablet Personal Computer), a laptop computer (Laptop Computer), a personal digital assistant (personal digital assistant, PDA for short), a mobile Internet device (Mobile Internet Device, MID), a wearable device (Wearable Device), or the like. A master device may be a 3G wireless router, a mobile phone, a tablet personal computer (Tablet Personal Computer), a laptop computer (Laptop Computer), a personal digital assistant (personal digital assistant, PDA for short), a mobile Internet device (Mobile Internet Device, MID), a wearable device (Wearable Device), or the like. A traffic control method in the embodiments of the present invention may be applied to a mobile hotspot; the master device accesses the Internet by using a cellular network and creates a mobile hotspot (a portable WLAN hotspot); a slave device accesses the Internet by using the hotspot created by the master device as an access point; and the slave device accesses the Internet through the hotspot by using data traffic of the master device. For the slave device, a type of a used network is a wireless local area network type. Generally, in an electronic device, a developer presets different operations performed by applications on the electronic device when different types of networks are used. When a wireless local area network is used, use of traffic in the application on the electronic device is not restricted, even in operations, such as automatically performing version update. Therefore, in a case in which the slave device uses the mobile hotspot of the master device, when the master device uses a cellular network type, the application on the slave device performs an operation for a wireless local area network type, thereby consuming a large amount of unnecessary traffic without user's realization. According to the traffic control method provided in the embodiments of the present invention, in a case in which the slave device uses the mobile hotspot, and when the master device uses a network of the cellular network type, use of traffic in the application on the slave device can be restricted.

With reference to FIG. 1 to FIG. 8, the following describes in detail a traffic control method provided in the embodiments of the present invention.

Referring to FIG. 1, FIG. 1 is a schematic flowchart of a traffic control method according to an embodiment of the present invention; and the method may include the following steps S100 to step S101.

S100. A slave device receives a notification message sent by a master device, where the notification message carries a type of a network used by the master device, and the type of the network includes a cellular network type or a wireless local area network type.

In an embodiment, encapsulation of the notification message may be implemented by extending the 802.11 standard protocol, or may be implemented by extending a proprietary protocol of a device vendor. Herein, implementation by extending the 802.11 standard protocol is used an example for description. The master device adds an information element to a beacon (Beacon) frame, where the information element includes the type of the network used by the master device, and the type of the network mainly includes a cellular network type or a wireless local area network type. It should be noted that the cellular network type is mainly 2G, 3G, 4G or general packet radio service (General Packet Radio Service, GPRS), 3GPP, Long Term Evolution technology (Long Term Evolution, LTE) or Mobile Telecommunications System (Universal Mobile Telecommunications System, UMTS), CDMA2000, Wideband Code Division Multiple Access (Wideband Code Division Multiple Access, WCDMA), or the like. The wireless local area network type is mainly WLAN, Wi-Fi, or the like. The master device sends the notification message, that is, broadcasts the Beacon frame, and the slave device receives the notification message delivered by the master device.

Specifically, a structure of the TCP/IP protocol stack, for example, the structural diagram described in FIG. 1-a, is used as an example for description. The slave device receives the Beacon frame through a communication channel connected to the master device. A function module that controls a connection to the master device and is in the slave device may be a communications module, such as a wireless local area network (Wireless Local Area Network, WLAN) module, a Bluetooth module, or a USB module. A radio frequency (Radio Frequency, RF) circuit corresponding to these communications modules specifically implements a communication function, so that wireless local area network communication, Bluetooth communication, infrared communication, or USB communication may be performed between the slave device and the master device. After receiving the Beacon frame that is sent by the master device and carries the type of the network used by the master device, a physical layer of the slave device sends the Beacon frame to a Media Access Control (Media Access Control, MAC) layer for parsing the Beacon frame. After the type of the network used by the master device is obtained by means of parsing, the MAC layer stores the type of the network used by the master device. In addition, authentication association is performed between the slave device and the master device, and after the authentication succeeds, the slave device establishes a connection to the master device. After the connection is established between the slave device and the master device, the MAC layer notifies an operating system at an application layer of the type of the network used by the master device. On a WLAN interface of the slave device, not only content such as signal strength, security, or encrypted or not are displayed, but also the type (for example, 3G) of the network used by the master device is displayed. Optionally, the type of the network used by the master device may not be displayed, but the type of the network used by the master device is stored and used for informing, after the connection is established, an operating system of the slave device.

Specifically, a process of performing authentication association between the slave device and the master device is as follows: A user selects the master device by using a user interface of the slave device and enters a pre-shared key; then, multiple messages are exchanged, so that the slave device and the master device separately implement authentication by using the pre-shared key; and after the authentication succeeds, a connection is established between the slave device and the master device, and the slave device and the master device separately obtain, through calculation by using the pre-shared key, an encryption key used for air interface communication.

Optionally, a manner of notifying, by the MAC layer, the operating system at the application layer of the type of the network used by the master device may be defined by the vendor, or may be implemented by a station management entity (Station Management Entity, SME). A communications interface is separately available between the SME, as the station management entity, and the MAC layer and between the SME and a driver of a Wi-Fi module. The driver is registered to the operating system of the slave device, and exchanges information with the operating system by using a message mechanism. As in the Wi-Fi protocol stack of the slave device, the MAC layer notifies, through the interface between the MAC layer and the SME and the interface between the SME and the driver of the Wi-Fi module and by using a mechanism for message exchange between the driver and the operating system, the operating system of the type of the network currently used by the master device. For example, when the cellular network type is used by the master device, the MAC layer notifies the operating system of the type (GPRS/3GPP/LTE or the like) of the network used when the master device accesses a cellular network.

Further, before the slave device receives the notification message delivered by the master device, the slave device further needs to enable a WLAN, so as to search for a network.

S101. The slave device restricts use of network traffic in an application on the slave device if the type of the network used by the master device is the cellular network type, where the slave device accesses the Internet by using the master device as an access point.

In an embodiment, when the type of the network used by the master device is the cellular network type, it indicates that traffic of the master device is limited and cannot be used without limitation. Although the wireless local area network is used on the slave device, actually, use of traffic in an application on the slave device needs to be controlled. Because the slave device uses the master device as an access point to access the Internet, traffic to be used is traffic of the master device, and the traffic of the master device is limited, the traffic to be used by the slave device needs to be controlled. For all applications on the slave device, in an application development phase, different operations that are corresponding to different network types and performed by the applications have been set. For example, if in the wireless local area network type, an application automatically performs version update; and if in the cellular network type, an application does not automatically perform version update, and when the user downloads an update, the user is reminded of traffic to be used and reminded whether to continue. Therefore, when learning that the type of the network used by the master device is the cellular network type, the slave device controls the application on the slave device to perform an operation corresponding to the cellular network type, thereby restricting use of network traffic in the application on the slave device.

Specifically, when the operating system of the slave device learns that the type of the network used by the master device is the cellular network type, the slave device restricts use of network traffic in the application on the slave device. A specific restriction method may be that a control system of the slave device implements automatic control. That is, the control system maintains an application that consumes a relatively large amount of traffic, such as video software (for downloading a video) or an application store (for updating an application) or the like. The operating system is controlled to automatically disable Internet access permission of these applications. If the user manually clicks a download button, the user is reminded of an amount of traffic to be consumed and is asked whether to continue. A specific restriction method may further be that the operating system informs the application that the type of the network used by the master device is the cellular network type, so that the application runs according to a running manner set for the cellular network type. An existing application has been set to perform different operations on a cellular network and on a wireless local area network, and a current network type is a cellular network type; therefore, the application on the slave device runs according to a status corresponding to the cellular network, and consequently, use of network traffic in the application on the slave device is restricted.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network, an operation corresponding to a wireless local area network type and use of network traffic in the application on the slave device is not restricted can be avoided. Therefore, traffic is saved, and an unnecessary traffic waste is reduced.

Referring to FIG. 2, FIG. 2 is a schematic flowchart of another traffic control method according to an embodiment of the present invention; and the method may include the following steps S200 to step S201.

S200. A slave device receives a notification message sent by a master device, where the notification message carries a type of a network used by the master device, and the type of the network includes a cellular network type or a wireless local area network type.

For step S200 in this embodiment of the present invention, reference may be made to step S100 shown in FIG. 1, and details are not described herein again.

S201. If the type of the network used by the master device is the cellular network type, the slave device disables a data connection of a preset application that consumes a relatively large amount of traffic and is in an application on the slave device, thereby disabling Internet access permission of the preset application and reducing use of network traffic in the application on the slave device.

In an embodiment, if the type of the network used by the master device is the cellular network type, the slave device disables a preset application that consumes a relatively large amount of traffic, where the preset application is generally an application with traffic consumed exceeding a preset threshold. When the type of the network is the cellular network type, traffic is limited; therefore, these preset applications may be disabled. It should be noted that the preset application may be video software (for downloading a video) or an application store (for updating an application or the like). An operating system disables Internet access permission of these applications. If the user manually clicks a download button, one dialog box pops up to remind the user of an amount of traffic to be consumed and ask the user whether to continue.

Optionally, after the preset application is disabled, the operating system controls another application on the slave device to perform an operation corresponding to the cellular network type, where the another application on the slave device may be an application in all applications on the slave device except the preset application. Specifically, an operation manner of the another application is an operation manner preset by a developer for the cellular network type.

Optionally, the slave device may also display the type of the network used by the master device, so as to notify the user that a cellular network is used by the master device. When the user uses the network traffic, the use needs to restricted; for example, an application consuming traffic is not used, or when the user starts an application consuming traffic, the slave device reminds the user of an amount of traffic to be consumed, so as to remind the user whether it is necessary to continue.

Optionally, in the foregoing embodiment, the preset application that consumes a relatively large amount of traffic has a traffic threshold. A data connection is disabled when an amount of traffic consumed by the preset application exceeds this traffic threshold. For example, in an application market, an update of an application in the application market consumes a large amount of traffic and the application belongs to the preset application that consumes a relatively large amount of traffic; however, if this app is opened only for browsing, not for downloading or updating a program, this operation may be allowed. That is, it is detected whether an amount of traffic consumed by the preset application is greater than the traffic threshold, and when the amount of traffic is greater than the traffic threshold, a data connection of the preset application is disabled.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 3:
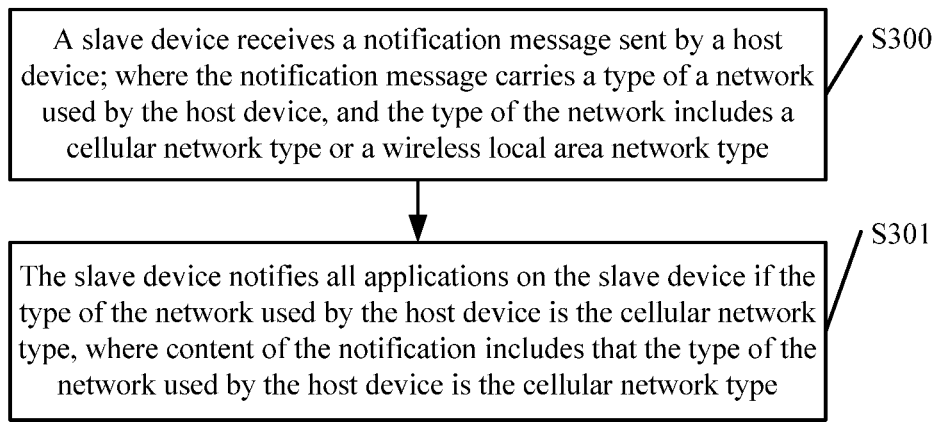
FIG. 3 is a schematic flowchart of still another traffic control method according to the present invention.

Referring to FIG. 3, FIG. 3 is a schematic flowchart of still another traffic control method according to an embodiment of the present invention; and the method may include the following steps S300 to step S301.

S300. A slave device receives a notification message sent by a master device, where the notification message carries a type of a network used by the master device, and the type of the network includes a cellular network type or a wireless local area network type.

For step S300 in this embodiment of the present invention, reference may be made to step S100 shown in FIG. 1, and details are not described herein again.

S301. The slave device notifies all applications on the slave device if the type of the network used by the master device is the cellular network type, where content of the notification includes that the type of the network used by the master device is the cellular network type, so that all the applications on the slave device run according to a preset running manner corresponding to the cellular network type, thereby restricting use of network traffic in an application on the slave device.

In an embodiment, that the slave device restricts use of network traffic in an application on the slave device may also be that an operating system of the slave device notifies all applications on the slave device, where content of the notification includes that the type of the network used by the master device is the cellular network type, so as to remind all the applications on the slave device that the applications need to run according to a preset running manner corresponding to the cellular network type. Running manners are preset for each application for different network types. For example, in the wireless local area network type, traffic to be used by the application is not restricted, and the application automatically performs version update; and in the cellular network type, the application does not automatically perform version update. In this way, when all the applications on the slave device run according to a running manner corresponding to the cellular network type, a relatively small amount of traffic is consumed, thereby restricting use of traffic in all the applications on the slave device.

Optionally, on the basis of the foregoing embodiment, the preset running manner corresponding to the cellular network type for the applications on the slave device may also be that it is preset by a user whether to perform data connection for applications on the slave device in the case of the cellular network type. Current mobile phones all have a control interface for managing use of traffic in an app, and the user can set apps for which data connection can be performed in the case of the cellular network type.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 4:
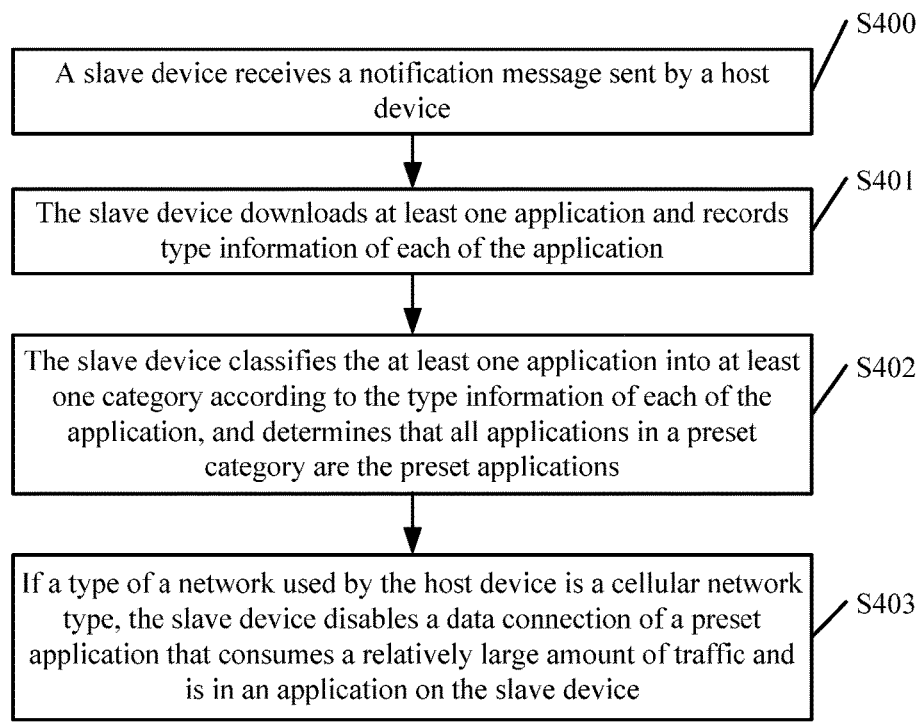
FIG. 4 is a schematic flowchart of still another traffic control method according to the present invention.

Referring to FIG. 4, FIG. 4 is a schematic flowchart of still another traffic control method according to an embodiment of the present invention; and the method may include the following steps S400 to step S403.

S400. A slave device receives a notification message sent by a master device, where the notification message carries a type of a network used by the master device, and the type of the network includes a cellular network type or a wireless local area network type.

For step S400 in this embodiment of the present invention, reference may be made to step S100 shown in FIG. 1, and details are not described herein again.

S401. The slave device downloads at least one application and records type information of each of the application.

In an embodiment, a preset application needs to be set in advance. A specific setting manner may be that, when downloading each application, the slave device records type information of each application, where the type information may represent a type of the application. For example, the type information may be video, entertainment, or the like.

S402. The slave device classifies the at least one application into at least one category according to the type information of each of the application, and determines that all applications in a preset category are preset applications.

In an embodiment, the slave device classifies all downloaded applications into at least one category according to the type information of each application. For example, the slave device may classify an application whose type information includes video, entertainment or other information into a first traffic consumption category in which the application consumes a relatively large amount of traffic, and classify an application whose type information includes chat, text or other information into a second traffic consumption category in which the application consumes a relatively small amount of traffic.

Further, all the applications in the preset category are determined to be the preset applications. For example, the preset category may be the first traffic consumption category in which the application consumes a relatively large amount of traffic.

S403. If the type of the network used by the master device is the cellular network type, the slave device disables a data connection of a preset application that consumes a relatively large amount of traffic and is in an application on the slave device, thereby disabling Internet access permission of the preset application and reducing use of network traffic in the application on the slave device.

For step S403 in this embodiment of the present invention, reference may be made to step S201 shown in FIG. 2, and details are not described herein again.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 5:
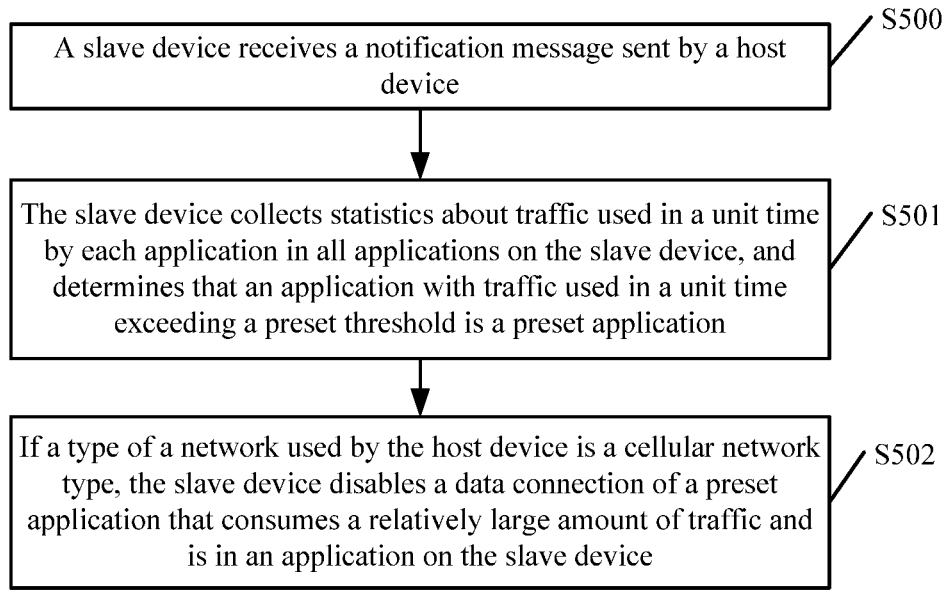
FIG. 5 is a schematic flowchart of still another traffic control method according to the present invention.

Referring to FIG. 5, FIG. 5 is a schematic flowchart of still another traffic control method according to an embodiment of the present invention; and the method may include the following steps S500 to step S502.

S500. A slave device receives a notification message sent by a master device, where the notification message carries a type of a network used by the master device, and the type of the network includes a cellular network type or a wireless local area network type.

For step S500 in this embodiment of the present invention, reference may be made to step S100 shown in FIG. 1, and details are not described herein again.

S501. The slave device collects statistics about traffic used in a unit time by each application in all the applications on the slave device, and determines that an application with traffic used in a unit time exceeding a preset threshold is a preset application.

In an embodiment, a setting manner of presetting a preset application may also be that the slave device collects statistics about traffic used in a unit time by each application in all the applications on the slave device. The setting of a unit time may be specified by a user; for example, the unit time may be two minutes. It should be noted that statistics about traffic used by each application during running is collected. An application with traffic used in a unit time exceeding a preset threshold is determined to be the preset application.

S502. If the type of the network used by the master device is the cellular network type, the slave device disables a data connection of a preset application that consumes a relatively large amount of traffic and is in an application on the slave device, thereby disabling Internet access permission of the preset application and reducing use of network traffic in the application on the slave device.

For step S502 in this embodiment of the present invention, reference may be made to step S201 shown in FIG. 2, and details are not described herein again.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 6:
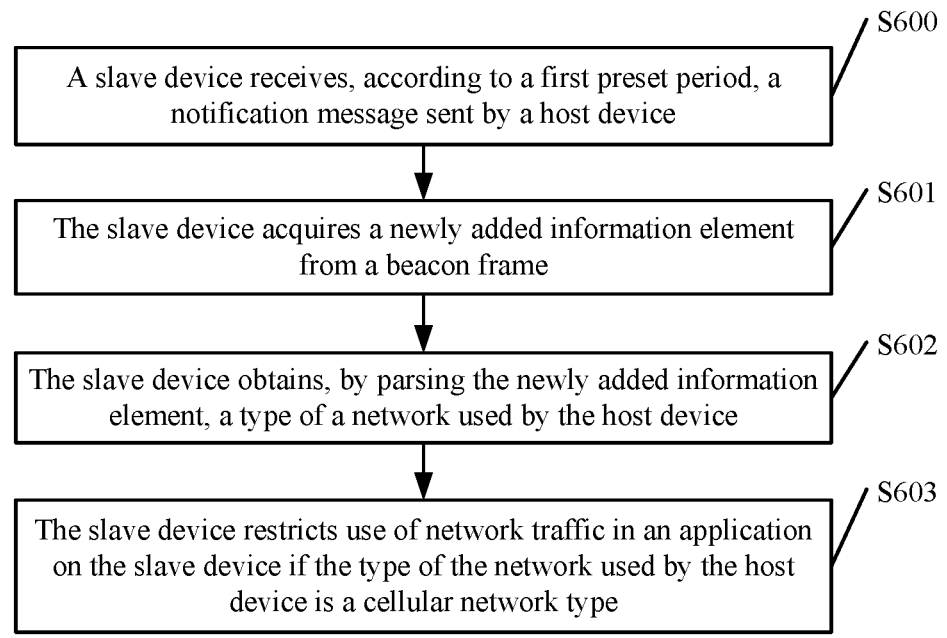
FIG. 6 is a schematic flowchart of still another traffic control method according to the present invention.

Referring to FIG. 6, FIG. 6 is a schematic flowchart of still another traffic control method according to an embodiment of the present invention; and the method may include the following steps S600 to step S603.

S600. A slave device receives, according to a first preset period, a notification message sent by a master device.

In an optional implementation manner, because the notification message that is sent by the master device to the slave device and includes a type of a network may be sent periodically, and the slave device generally works in a power saving mode in which the slave device is not necessarily capable of receiving every notification message sent by the master device, the slave device also needs to receive, according to a first preset period, the notification message sent by the master device.

S601. The slave device acquires a newly added information element from a beacon frame.

In an optional implementation manner, the notification message may exist in a form of a beacon frame; the master device may encapsulate the type of the network used by the master device into one newly added information element in the beacon frame; and the newly added information element may be a newly defined information element or may be an information element in an existing standard. Therefore, from a perspective of a slave device side, the slave device needs to acquire, from the received beacon frame, the newly added information element including the type of the network used by the master device. A specific acquiring manner may be decapsulating the beacon frame.

S602. The slave device obtains, by parsing the newly added information element, a type of a network used by the master device.

In an optional implementation manner, the newly added information element includes the type of the network used by the master device; therefore, the slave device needs to obtain, by parsing the newly added information element, the type of the network used by the master device, and may perform parsing according to a field occupied by the type of the network in the newly added information element.

S603. The slave device restricts use of network traffic in an application on the slave device if the type of the network used by the master device is a cellular network type.

For step S603 in this embodiment of the present invention, reference may be made to step S101 shown in FIG. 1, and details are not described herein again.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 7:
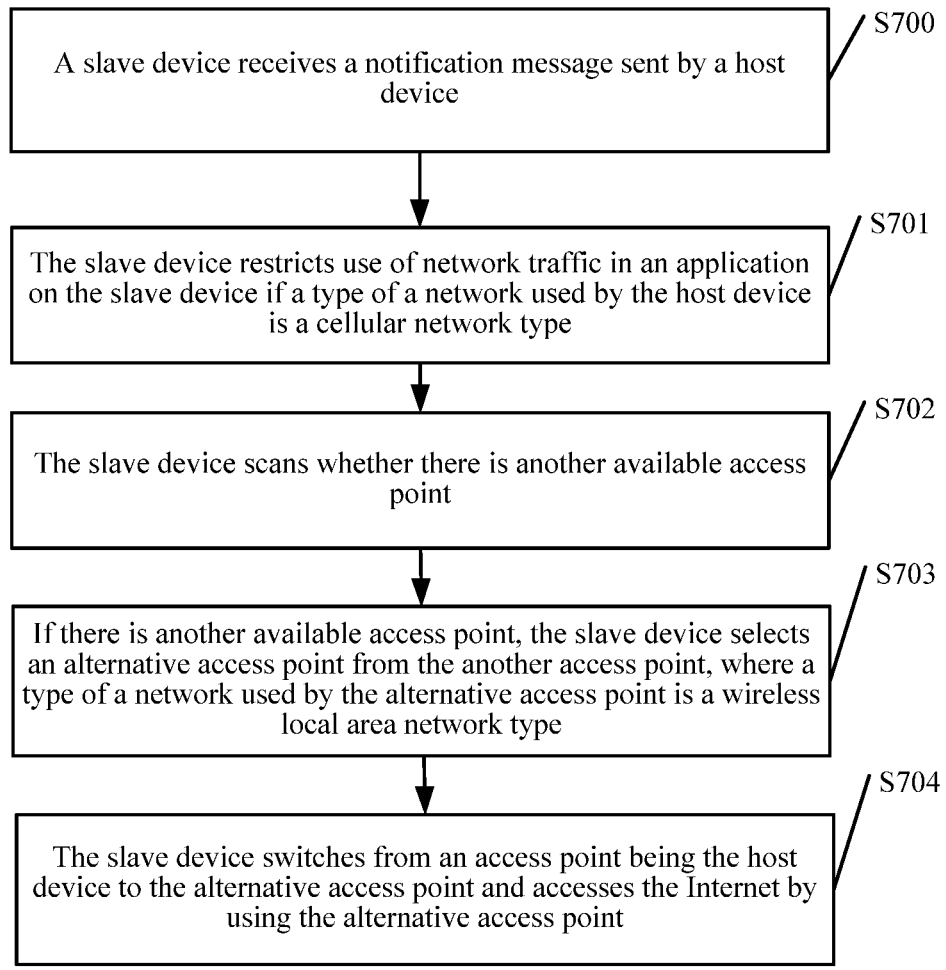
FIG. 7 is a schematic flowchart of still another traffic control method according to the present invention.

Referring to FIG. 7, FIG. 7 is a schematic flowchart of still another traffic control method according to an embodiment of the present invention; and the method may include the following steps S700 to step S704.

S700. A slave device receives a notification message sent by a master device, where the notification message carries a type of a network used by the master device, and the type of the network includes a cellular network type or a wireless local area network type.

In an optional implementation manner, a manner in which the notification message is used to notify the type of the network used by the master device may be carrying an identifier that can represent the type of the network used by the master device; for example, the identifier may be a device type identifier. When the master device is a mobile device, the identifier can represent that the master device is a mobile Android device; for example, since the Android 4.1 version, Google has uniformly added an identifier "ANDROID_METERED". With the identifier, it can be determined whether the type of the network used by the master device is the cellular network type or the wireless local area network type. A specific determining manner may be that: when the master device is a mobile device, the master device sends its mobile device type identifier; when the slave device obtains, by means of parsing, the mobile device type identifier carried in the notification message, the slave device can determine that the type of the network used by the master device is the cellular network type; when the notification message does not carry the mobile device type identifier, the slave device can determine that the type of the network used by the master device is the wireless local area network type.

S701. The slave device restricts use of network traffic in an application on the slave device if the type of the network used by the master device is the cellular network type.

For step S701 in this embodiment of the present invention, reference may be made to step S101 in FIG. 1 and details are not described herein again.

S702. The slave device scans whether there is another available access point.

In an optional implementation manner, after the slave device accesses the Internet by using the master device as the access point, the slave device continues to scan whether there is another available access point. Generally, as long as the slave device is within coverage of another access point, the slave device can obtain, by means of searching, an SSID of the another access point.

S703. If there is another available access point, the slave device selects an alternative access point from the another access point, where a type of a network used by the alternative access point is the wireless local area network type.

In an optional implementation manner, if there is another available access point, that is, the slave device obtains, by means of searching, an SSID of the another access point, the slave device needs to select an alternative access point from the another access point, where a type of a network used by the alternative access point is the wireless local area network type.

A specific selection manner may be determined according to a notification message delivered by the another access point. The notification message carries a type of a network used by an access point. When the slave device parses the received notification message and obtains that a type of a network used by an access point is the wireless local area network type, the slave device determines the access point as an alternative access point.

Optionally, a parsing manner of parsing the received notification message by the slave device to obtain a type of a network used by an access point may be determining whether the notification message carries a mobile device type identifier, and when the notification message does not carry the mobile device type identifier, it may be determined that the type of the network used by the master device is the wireless local area network type.

S704. The slave device switches from an access point being the master device to the alternative access point and accesses the Internet by using the alternative access point.

In an optional implementation manner, to reduce use of traffic on the master device, when the slave device obtains, by means of searching, an alternative access point with a type of a used network being the wireless local area network type, the slave device switches from the previous access point being the master device to the alternative access point and accesses the Internet by using the alternative access point.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 8:
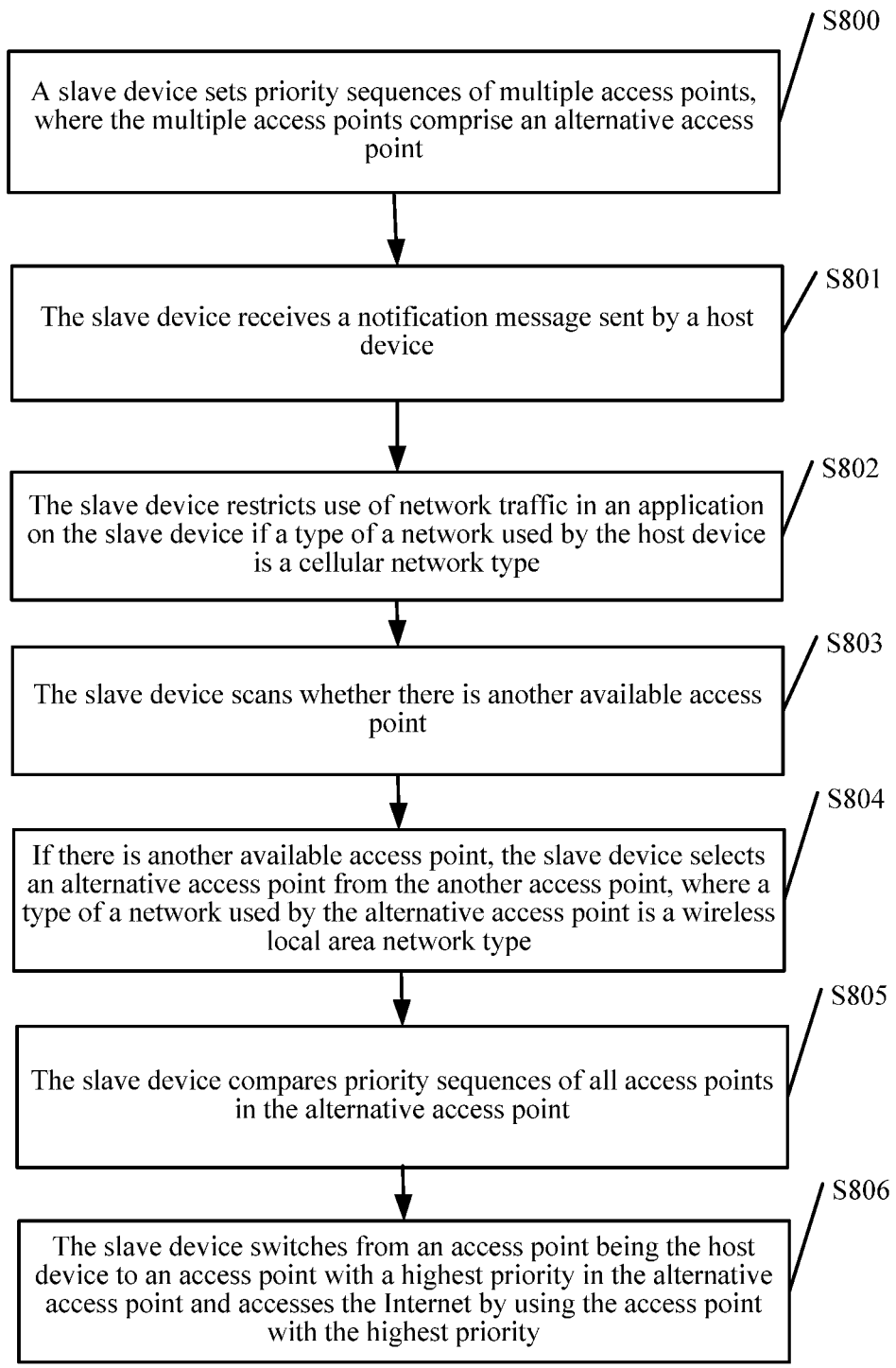
FIG. 8 is a schematic flowchart of still another traffic control method according to the present invention.

Referring to FIG. 8, FIG. 8 is a schematic flowchart of still another traffic control method according to an embodiment of the present invention. If an alternative access point includes at least two access points, the method may include the following steps S800 to step S806.

S800. A slave device sets priority sequences of multiple access points, where the multiple access points include the alternative access point.

In an optional implementation manner, the slave device may obtain, by means of searching, SSIDs of multiple access points when searching for an access point. For ease of determining an access point that needs to be used, priority sequences of the multiple access points need to be set on the slave device. The priority sequences may be in a high/medium/low form or an Arabic data order; for example, 1 represents a highest priority and 5 represents a lowest priority.

Optionally, the following two optional implementation manners may be available for a setting manner of setting the priority sequences:

in a first optional implementation manner, the slave device acquires priority sequences of all access points in the multiple access points, where the priority sequences are set by a user; and in an optional implementation manner, the user may manually set the priority sequences of all the access points in the multiple access points, for example, may set a priority of an access point being a home router as a highest priority. The slave device acquires the priority sequences of all the access points in the multiple access points, where the priority sequences are set by the user; and in a second optional implementation manner, the slave device collects, within a preset period of time, statistics about a length of use time for which the slave device uses each access point in the multiple access points, and determines priority sequences of all access points in the multiple access points according to the length of use time of each access point in the multiple access points, and in an optional implementation manner, a manner of setting the priority sequences by the slave device may also be an automatic learning mode, in which a behavior of using each access point by the user is tracked to perform automatic setting; for example, statistics about a length of use time for which the slave device uses each access point in the multiple access points are collected within a preset period of time and the priority sequences of all the access points in the multiple access points are determined according to the length of use time. An access point with a longest length of use time may be set to a highest priority.

S801. The slave device receives a notification message sent by a master device, where the notification message carries a type of a network used by the master device, and the type of the network includes a cellular network type or a wireless local area network type.

S802. The slave device restricts use of network traffic in an application on the slave device if the type of the network used by the master device is the cellular network type.

For steps S801 to S802 in this embodiment of the present invention, reference may be made to steps S100 to S101 in FIG. 1 and details are not described herein again.

S803. The slave device scans whether there is another available access point.

S804. If there is another available access point, the slave device selects an alternative access point from the another access point, where a type of a network used by the alternative access point is the wireless local area network type.

For steps S803 to S804 in this embodiment of the present invention, reference may be made to steps S702 to S703 in FIG. 7 and details are not described herein again.

S805. The slave device compares priority sequences of all access points in the alternative access point.

In an optional implementation manner, when the alternative access point includes at least two access points, that is, the slave device obtains, by means of searching at the same time, at least two access points with a type of a used network being the wireless local area network type, the slave device needs to compare the priority sequences of all the access points in the alternative access point. It should be noted that the priority sequences of all the access points in the alternative access point may also be determined automatically according to signal strength of each access point; for example, an access point with strongest signal strength is automatically set to a highest priority and an access point with weakest signal strength is automatically set to a lowest priority.

S806. The slave device switches from an access point being the master device to an access point with a highest priority in the alternative access point and accesses the Internet by using the access point with the highest priority.

In an optional implementation manner, the slave device switches from the access point being the master device to the access point with the highest priority in the alternative access point and accesses the Internet by using the access point with the highest priority. In this access point switching manner, not only traffic of the master device can be saved, but also a most appropriate access point can be selected for accessing the Internet.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 9:
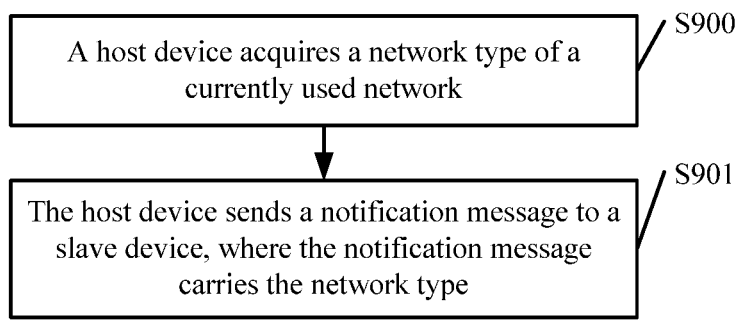
FIG. 9 is a schematic flowchart of still another traffic control method according to the present invention.

Referring to FIG. 9, FIG. 9 is a schematic flowchart of still another traffic control method according to an embodiment of the present invention; and the method may include the following steps S900 to step S901.

S900. A master device acquires a network type of a currently used network, where the network type includes a cellular network type or a wireless local area network type.

In an embodiment, the master device acquires the network type of the currently used network. In an actual scenario, the master device may use a cellular network to access the Internet, where the cellular network may be GPRS, 3GPP, LTE or the like; or the master device may use a wireless local area network, for example, Wi-Fi, to access the Internet.

It should be noted that before the master device acquires the network type of the currently used network, a data network needs to be enabled, a mobile hotspot needs to be created, a slave device accesses the Internet by using the mobile hotspot created by the master device as an access point, a notification message carrying the network type of the network used by the master device is sent to the slave device, and the slave device uses data traffic of the master device. In addition, if the master device first creates the mobile hotspot, establishes a connection to the slave device, and then enables the data network, after the data network is enabled, the master device sends, to the slave device, the notification message carrying the network type of the network used by the master device.

S901. The master device sends a notification message to a slave device, where the notification message carries the network type, so that the slave device restricts use of network traffic in an application on the slave device when the network type is the cellular network type, where the slave device accesses the Internet by using the master device as an access point.

In an embodiment, after the network type of the used network is acquired, the master device needs to send the network type in a form of a notification message to the slave device. A specific sending manner may be converting the network type into information in a specific format, encapsulating the information, and sending the information to the slave device, so that the slave device controls, when the network type of the network used by the master device is the cellular network type, an application on the slave device to perform an operation corresponding to the cellular network, thereby restricting use of traffic in the application on the slave device and reducing use of traffic on the master device. Specifically, a process of encapsulating the network type by the master device may be based on the extended 802.11 standard protocol or may be based on a proprietary protocol of a vendor.

Optionally, the encapsulation of the notification message is described herein based on the extended 802.11 standard protocol. The encapsulation of the notification message may include encapsulation of information at layers of a protocol stack. As described in FIG. 1-a, a protocol stack structure of the network communication protocol (Transmission Control Protocol/Internet Protocol, TCP/IP) is used as an example for description. After an application layer of the master device enables a data network and creates a mobile hotspot, an MAC layer encapsulates information about the network type of the network used by the master device, for example, may encapsulate the information into a Beacon frame, and then a physical layer broadcasts the Beacon frame. A communications module, such as a wireless location area network (Wireless Local Area Network, WLAN) module, a Bluetooth module, or a USB module may control the master device to connect to the slave device. A radio frequency (Radio Frequency, RF) circuit corresponding to these communications modules specifically implements a communication function, so that wireless local area network communication, Bluetooth communication, infrared communication, or USB communication may be performed between the slave device and the master device. In this way, the slave device may receive the Beacon frame broadcasted by the master device.

Specifically, a process of encapsulating the network type may be, in the 802.11 protocol, first encapsulating the network type into a newly added information element (Information Elements, IE) and then encapsulating the newly added information element. A process of encapsulating the newly added information element may be encapsulating the newly added IE into a broadcast frame and then sending the broadcast frame to the slave device, that is, sending the notification message to the slave device. In an 802.11 frame, there are mainly three types of frame structures: data frame, control frame, and management frame. A constant bit and an information element that are included in the body of the management frame are used for transporting information. There are many types of management frames, for example, beacon (Beacon) frame, probe request (Probe Request), and probe response (Probe Response), which are separately responsible for maintenance functions at a link layer. The Beacon frame is a very important maintenance mechanism and mainly used for declaring the existence of a network. On a basic network, a Beacon frame sent regularly by an access point of a master device may allow a slave device to learn of the existence of the network and then to adjust a parameter required for joining in the network. Therefore, optionally, the newly added IE may be encapsulated into the Beacon frame.

A format of a Beacon frame includes a MAC header and a frame body. The frame body includes many mandatory and optional options (for details, reference may be made to the IEEE 802.11 standard). The newly added IE in the present invention belongs to a piece of content in the body of the Beacon frame, and no limitation is imposed on a specific location of the newly added IE in the frame format. Generally, an IE is a variable-length component of the management frame and generally includes one Element ID field, one Length field, and one field whose length is not fixed.

For the newly added IE involved in the present invention, one newly defined information element may be used or an existing information element in the 802.11 standard may be used. For example, a "Last" information element in a Beacon frame is "Vendor Specific", which is ranked $56^{th}$ currently and may be one or more. In addition, an information element used for the newly added IE may be defined by a vendor. If an existing "Last" information element is used, parameters in the information element are set. For example, Element ID may be set to 221; Organization Identifier is used to represent a network operator, for example, national China Mobile, China Unicom, and China Telecom; Vendor-specific content may be used to enumerate a network type (any name related to a network type, such as 2G, 3G, 4G, or WLAN; or GPRS, 3GPP, LTE, Wi-Fi, or the like; or UMTS, CDMA2000, WCDMA, or the like); and Length, a total length of the IE, is between 3 and 257 bytes.

It should be noted that the master device may first determine whether the network type is the cellular network type; if the network type is the cellular network type, the IE is included in the Beacon frame; if the network type is the wireless local area network, the IE does not need to be included in the Beacon frame.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 10:
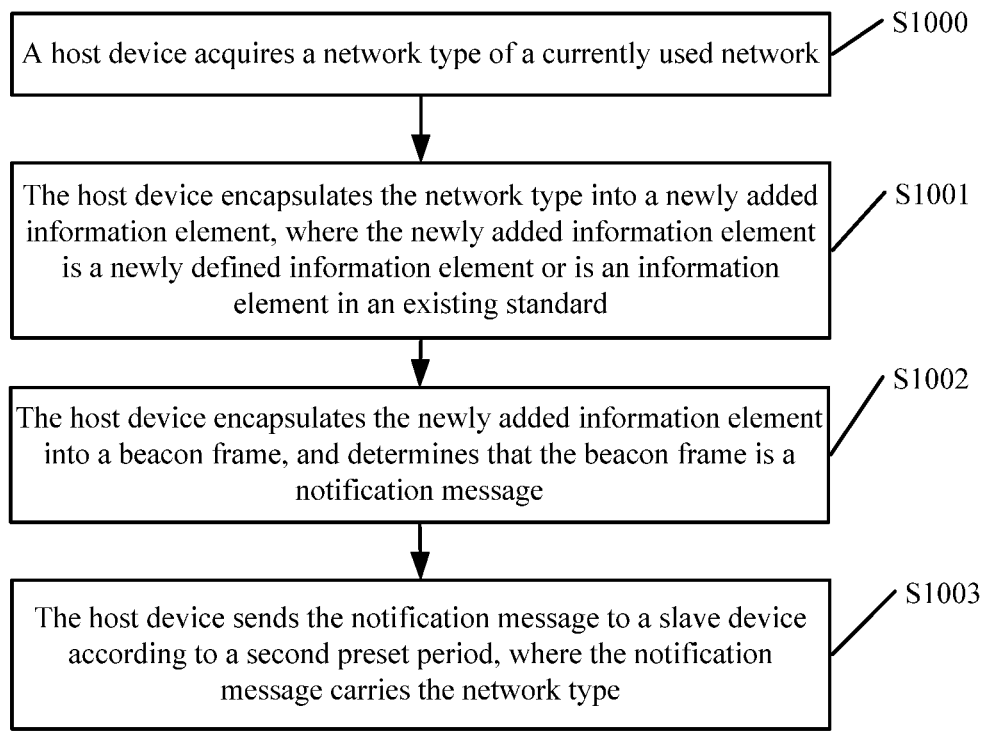
FIG. 10 is a schematic flowchart of still another traffic control method according to the present invention.

Referring to FIG. 10, FIG. 10 is a schematic flowchart of still another traffic control method according to an embodiment of the present invention; and the method may include the following steps S1000 to step S1003.

S1000. A master device acquires a network type of a currently used network, where the network type includes a cellular network type or a wireless local area network type.

For step S1000 in this embodiment of the present invention, reference may be made to step S900 shown in FIG. 9, and details are not described herein again.

S1001. The master device encapsulates the network type into a newly added information element, where the newly added information element is a newly defined information element or is an information element in an existing standard.

In an optional implementation manner, if encapsulation of a notification message is performing encapsulation by extending the 802.11 standard protocol, a specific process may be first encapsulating the network type into a newly added information element, where the newly added information element belongs to a piece of content in a frame body of a frame format. It should be noted that no limitation is imposed on a specific location of the newly added information element in the frame body.

The newly added information element in this embodiment may be a variable-length component of a management frame and generally includes one Element ID field, one Length field, and one field whose length is not fixed. Specifically, the newly added information element may be one newly defined information element or may be an existing information element in the 802.11 standard. For example, a "Last" information element in a Beacon frame is "Vendor Specific", which is ranked 56$^{th}$ currently and may be one or more.

S1002. The master device encapsulates the newly added information element into a beacon frame, and determines that the beacon frame is a notification message.

In an optional implementation manner, after the newly added information element is encapsulated, the newly added information element is then encapsulated into a beacon frame, where the beacon frame Beacon frame is a very important maintenance mechanism and mainly used for declaring the existence of a network. On a basic network, a Beacon frame sent regularly by an access point of a master device may allow a slave device to learn of the existence of the network and then to adjust a parameter required for joining in the network. Therefore, optionally, the newly added IE may be encapsulated into the Beacon frame and the beacon frame may be determined to be a notification message.

S1003. The master device sends the notification message to a slave device according to a second preset period, where the notification message carries the network type, so that the slave device restricts use of network traffic in an application on the slave device when the network type is the cellular network type, where the slave device accesses the Internet by using the master device as an access point.

In an optional implementation manner, the slave device generally works in a power saving mode in which the slave device is not necessarily capable of receiving every notification message sent by the master device. Therefore, the master device sends a notification message to the slave device according to a second preset period. It should be noted that the second preset period may be the same as or may be different from a first preset period.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

As shown in FIG. 1-b, FIG. 1-b is a schematic flowchart of information exchange between a master device and a slave device according to an embodiment of the present invention. As shown in the figure:

S0. A master device enables a data network, creates a mobile hotspot, and sets a service set identifier (Service Set Identifier, SSID) and a password.

S1. The master device acquires a type of a used network, encapsulates the type of the network into a newly added IE, and then encapsulates the newly added IE into a Beacon frame.

Specifically, the newly added IE may use one newly defined information element or may be an existing information element in the 802.11 standard. For example, a "Last" information element in a Beacon frame is "Vendor Specific". If an existing "Last" information element is used, parameters in the information element are set.

In all execution steps in this step, the encapsulation may be performed by an encapsulating unit in the master device.

S2. A slave device enables a WLAN network and searches for a surrounding network.

Specifically, from a perspective of a slave device side, it may be that a WLAN switch is turned on and then a nearby Wi-Fi network is searched for actively and a connection is established; or it may be that, in a case in which a WLAN is enabled, a prompt about a nearby available network is received and is clicked to establish a connection.

S3. The master device broadcasts the Beacon frame, where the Beacon frame carries the newly added IE, and the newly added IE includes the type of the network currently used by the master device.

Specifically, a manner of broadcasting the Beacon frame by the master device may be periodically broadcasting the Beacon frame, and if the WLAN is enabled by the slave device, the slave device is reminded that there is an available network. The Beacon frame not only includes the type of the network currently used by the master device, but also includes an SSID of a wireless network.

S4. The slave device sends a probe request.

Specifically, after enabling the wireless network, the slave device sends the probe request, that is, sends a Probe request frame, and searches for a nearby network.

S5. The master device sends a probe response.

Specifically, after receiving the probe request sent by the slave device, the master device sends a probe response, that is, sends a Proble response frame, to the slave device according to the probe request sent by the slave device. Actually, an information content range included in the Probe response frame is the same as an information content range included in the beacon frame; however, specific information included in the Probe response is determined according to specific information requested in the probe request. Therefore, it can be implemented by adding the foregoing newly added IE to the Beacon frame.

S6. The slave device parses the received Beacon frame or the probe response (Probe response) and displays the SSID and/or the type of the network.

Specifically, the slave device may not display the type of the network, but a MAC layer of the slave device records the type of the network, so as to notify an operating system of the slave device of the type of the network used by the master device.

S7. A user selects the SSID and enters the password.

S8. The slave device and the master device perform authorization and authentication based on the password entered by the user, and establish a connection.

Specifically, the authentication between the slave device and the master device may be performed by using a pre-shared key.

S9. A MAC layer of the slave device informs an operating system of the type of the network.

Specifically, a manner of notifying, by the MAC layer, the operating system at an application layer of the type of the network used by the master device may be implemented by using a short message entity (short message entity, SME).

S10. The operating system of the slave device automatically controls use of traffic in an application on the slave device.

Specifically, a control method of the operating system may be automatically disabling Internet access permission of an application that consumes a large amount of traffic. If the user manually clicks a download button, the user is reminded of an amount of traffic to be consumed and is asked whether to continue. A specific control method may further be that the operating system informs the application that the type of the network used by the master device is the cellular network type, so that the application runs according to a running manner set for the cellular network type.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

With reference to FIG. 11 to FIG. 18, the following describes in detail a structure of a traffic control apparatus provided in an embodiment of the present invention. It should be noted that the following traffic control apparatus may be applied to the foregoing methods.

Figure 11:
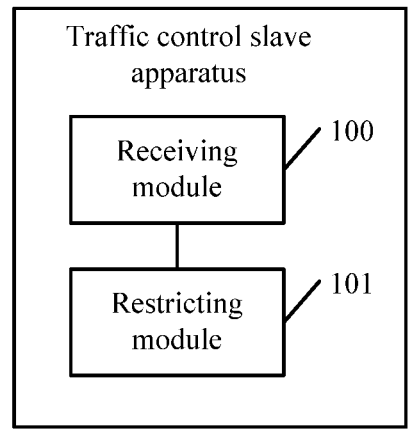
FIG. 11 is a schematic structural diagram of a traffic control slave apparatus according to the present invention.

Referring to FIG. 11, FIG. 11 is a schematic structural diagram of a traffic control slave apparatus according to an embodiment of the present invention. The traffic control slave apparatus may include: a receiving module 100 and a restricting module 101.

The receiving module 100 is configured to receive a notification message sent by a master apparatus, where the notification message carries a type of a network used by the master device, and the type of the network includes a cellular network type or a wireless local area network type.

In an embodiment, encapsulation of the notification message may be implemented by extending the 802.11 standard protocol, or may be implemented by extending a proprietary protocol of a device vendor. Herein, implementation by extending the 802.11 standard protocol is used an example for description. The master device adds an information element to a beacon (Beacon) frame, where the information element includes the type of the network used by the master device, and the type of the network mainly includes a cellular network type or a wireless local area network type. It should be noted that the cellular network type is mainly 2G, 3G, 4G or general packet radio service (General Packet Radio Service, GPRS), 3GPP, Long Term Evolution technology (Long Term Evolution, LTE) or Mobile Telecommunications System (Universal Mobile Telecommunications System, UMTS), CDMA2000, Wideband Code Division Multiple Access (Wideband Code Division Multiple Access, WCDMA), or the like. The wireless local area network type is mainly WLAN, Wi-Fi, or the like. The master device sends a notification message, that is, broadcasts the Beacon frame, and the receiving module 100 on the slave device receives the notification message delivered by the master device.

Specifically, a structure of the TCP/IP protocol stack, for example, the structural diagram described in FIG. 1-a, is used as an example for description. The slave device receives the Beacon frame through a communication channel connected to the master device. A function module that controls a connection to the master device and is in the slave device may be a communications module, such as a wireless local area network (Wireless Local Area Network, WLAN) module, a Bluetooth module, or a USB module. A radio frequency (Radio Frequency, RF) circuit corresponding to these communications modules specifically implements a communication function, so that wireless local area network communication, Bluetooth communication, infrared communication, or USB communication may be performed between the slave device and the master device. After receiving the Beacon frame that is sent by the master device and carries the type of the network used by the master device, a physical layer of the slave device sends the Beacon frame to a Media Access Control (Media Access Control, MAC) layer for parsing the Beacon frame. After the type of the network used by the master device is obtained by means of parsing, the MAC layer stores the type of the network used by the master device. In addition, authentication association is performed between the slave device and the master device, and after the authentication succeeds, the slave device establishes a connection to the master device. After the connection is established between the slave device and the master device, the MAC layer notifies an operating system at an application layer of the type of the network used by the master device. On a WLAN interface of the slave device, not only content such as signal strength, security, or encrypted or not are displayed, but also the type (for example, 3G) of the network used by the master device is displayed. Optionally, the type of the network used by the master device may not be displayed, but the type of the network used by the master device is stored and used for informing, after the connection is established, an operating system of the slave device.

Specifically, a process of performing authentication association between the slave device and the master device is as follows: A user selects the master device by using a user interface of the slave device and enters a pre-shared key; then, multiple messages are exchanged, so that the slave device and the master device separately implement authentication by using the pre-shared key; and after the authentication succeeds, a connection is established between the slave device and the master device, and the slave device and the master device separately obtain, through calculation by using the pre-shared key, an encryption key used for air interface communication.

Optionally, a manner of notifying, by the MAC layer, the operating system at the application layer of the type of the network used by the master device may be defined by the vendor, or may be implemented by a station management entity (Station Management Entity, SME). A communications interface is separately available between the SME, as the station management entity, and the MAC layer and between the SME and a driver of a Wi-Fi module. The driver is registered to the operating system of the slave device, and exchanges information with the operating system by using a message mechanism. As in the Wi-Fi protocol stack of the slave device, the MAC layer notifies, through the interface between the MAC layer and the SME and the interface between the SME and the driver of the Wi-Fi module and by using a mechanism for message exchange between the driver and the operating system, the operating system of the type of the network currently used by the master device. For example, when the cellular network type is used by the master device, the MAC layer notifies the operating system of the type (GPRS/3GPP/LTE or the like) of the network used when the master device accesses a cellular network.

Further, before the receiving module 100 on the slave device receives the notification message delivered by the master device, the slave device further needs to enable a WLAN, so as to search for a network.

Optionally, the receiving module 100 is specifically configured to receive, according to a first preset period, the notification message sent by the master device.

Specifically, because the notification message that is sent by the master device to the slave device and includes a type of a network may be sent periodically, and the slave device generally works in a power saving mode in which the slave device is not necessarily capable of receiving every notification message sent by the master device, the receiving module 100 on the slave device also needs to receive, according to a first preset period, the notification message sent by the master device.

The restricting module 101 is configured to restrict use of network traffic in an application on the slave device if the type of the network used by the master device is the cellular network type, where the slave apparatus accesses the Internet by using the master apparatus as an access point.

In an embodiment, when the type of the network used by the master device is the cellular network type, it indicates that traffic of the master device is limited and cannot be used without limitation. Although the wireless local area network is used on the slave device, actually, use of traffic in an application on the slave device needs to be controlled by the restricting module 101. Because the slave device uses the master device as an access point to access the Internet, traffic to be used is traffic of the master device, and the traffic of the master device is limited, the traffic to be used by the slave device needs to be controlled. For all applications on the slave device, in an application development phase, different operations that are corresponding to different network types and performed by the applications have been set. For example, if in the wireless local area network type, an application automatically performs version update; and if in the cellular network type, an application does not automatically perform version update, and when the user downloads an update, the user is reminded of traffic to be used and reminded whether to continue. Therefore, when learning that the type of the network used by the master device is the cellular network type, the restricting module 101 controls the application on the slave device to perform an operation corresponding to the cellular network type, thereby restricting use of network traffic in the application on the slave device.

Specifically, when the operating system of the slave device learns that the type of the network used by the master device is the cellular network type, the restricting module 101 restricts use of network traffic in the application on the slave device. A specific restriction method may be that a control system implements automatic control. That is, the control system maintains a type of an application that consumes a relatively large amount of traffic, such as video software (for downloading a video) or an application store (for updating an application). The restricting module 101 automatically disables Internet access permission of these applications. If the user manually clicks a download button, the user is reminded of an amount of traffic to be consumed and is asked whether to continue. A specific restriction method may further be that the operating system informs the application that the type of the network used by the master device is the cellular network type, so that the restricting module 101 controls the application to run according to a running manner set for the cellular network type. An existing application has been set to perform different operations on a cellular network and on a wireless local area network, and a current network status is a cellular network type; therefore, the application on the slave device runs according to a status corresponding to the cellular network, and consequently, use of network traffic in the application on the slave device is restricted.

Specifically, the restricting module 101 is specifically configured to: if the type of the network used by the master apparatus is the cellular network type, disable a data connection of a preset application that consumes a relatively large amount of traffic and is in the application on the slave device, thereby disabling Internet access permission of the preset application and reducing use of the network traffic in the application on the slave device.

In an embodiment, if the type of the network used by the master device is the cellular network type, the restricting module 101 on the slave device disables a preset application that consumes a relatively large amount of traffic, where the preset application is generally an application with traffic consumed exceeding a preset threshold. When the type of the network is the cellular network type, traffic is limited; therefore, these preset applications may be disabled. It should be noted that the preset application may be video software (for downloading a video) or an application store (for updating an application or the like). An operating system disables Internet access permission of these applications. If the user manually clicks a download button, one dialog box pops up to remind the user of an amount of traffic to be consumed and ask the user whether to continue.

Optionally, after the restricting module 101 disables the preset application, the operating system controls another application on the slave device to perform an operation corresponding to the cellular network type, where the another application on the slave device may be an application in all applications on the slave device except the preset application. Specifically, an operation manner of the another application is an operation manner preset by a developer for the cellular network type.

Optionally, in the foregoing embodiment, the preset application that consumes a relatively large amount of traffic has a traffic threshold. The restricting module 101 disables a data connection when an amount of traffic consumed by the preset application exceeds this traffic threshold. For example, in an application market, an update of an application in the application market consumes a large amount of traffic and the application belongs to the preset application that consumes a relatively large amount of traffic; however, if this app is opened only for browsing, not for downloading or updating a program, this operation may be allowed. That is, it is detected whether an amount of traffic consumed by the preset application is greater than the traffic threshold, and when the amount of traffic is greater than the traffic threshold, a data connection of the preset application is disabled.

Alternatively, the restricting module 101 is specifically configured to notify all applications on the slave apparatus if the type of the network used by the master device is the cellular network type, where content of the notification includes that the type of the network used by the master apparatus is the cellular network type, so that all the applications on the slave apparatus run according to a preset running manner corresponding to the cellular network type, thereby restricting use of the network traffic in the application on the slave apparatus.

In an embodiment, that the restricting module 101 on the slave device restricts use of network traffic in an application on the slave device may also be that an operating system of the slave device notifies all applications on the slave device, where content of the notification includes that the type of the network used by the master device is the cellular network type, so as to remind all the applications on the slave device that the applications need to run according to a preset running manner corresponding to the cellular network type. Running manners are preset for each application for different network types. For example, in the wireless local area network type, traffic to be used by the application is not restricted, and the application automatically performs version update; and in the cellular network type, the application does not automatically perform version update. In this way, when all the applications on the slave device run according to a running manner corresponding to the cellular network type, a relatively small amount of traffic is consumed, thereby restricting use of traffic in all the applications on the slave device.

Optionally, on the basis of the foregoing embodiment, the preset running manner corresponding to the cellular network type for the applications on the slave device may also be that it is preset by a user whether to perform data connection for applications on the slave device in the case of the cellular network type. Current mobile phones all have a control interface for managing use of traffic in an app, and the user can set apps for which data connection can be performed in the case of the cellular network type.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 12:
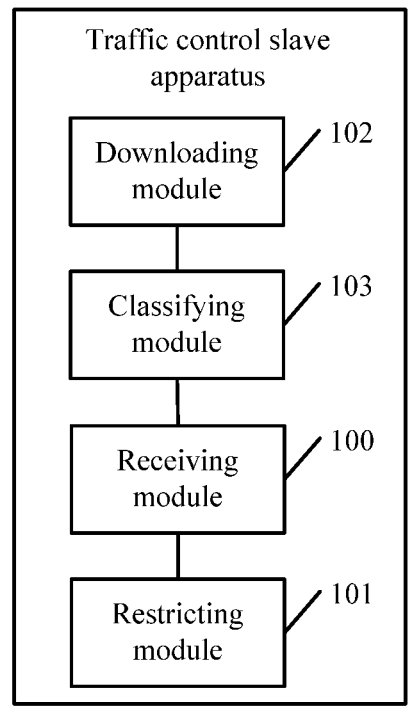
FIG. 12 is a schematic structural diagram of another traffic control slave apparatus according to the present invention.

Referring to FIG. 12, FIG. 12 is a schematic structural diagram of another traffic control slave apparatus according to an embodiment of the present invention. The traffic control apparatus may include: a receiving module 100, a restricting module 101, a downloading module 102, and a classifying module 103, where for the receiving module 100 and the restricting module 101, reference may be made to FIG. 11, and details are not described herein again.

The downloading module 102 is configured to download at least one application and record type information of each of the application.

In an embodiment, a preset application needs to be set in advance. A specific setting manner may be that, when downloading each application, the downloading module 102 on the slave device records type information of each application, where the type information may represent a type of the application. For example, the type information may be video, entertainment, or the like.

The classifying module 103 is configured to: classify the at least one application into at least one category according to the type information of each of the application, and determine that all applications in a preset category are the preset applications.

In an embodiment, the classifying module 103 on the slave device classifies all downloaded applications into at least one category according to the type information of each application. For example, the classifying module 103 may classify an application whose type information includes video, entertainment or other information into a first traffic consumption category in which the application consumes a relatively large amount of traffic, and the classifying module 103 classifies an application whose type information includes chat, text or other information into a second traffic consumption category in which the application consumes a relatively small amount of traffic.

Further, the classifying module 103 determines all the applications in the preset category to be the preset applications. For example, the preset category may be the first traffic consumption category in which the application consumes a relatively large amount of traffic.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 13:
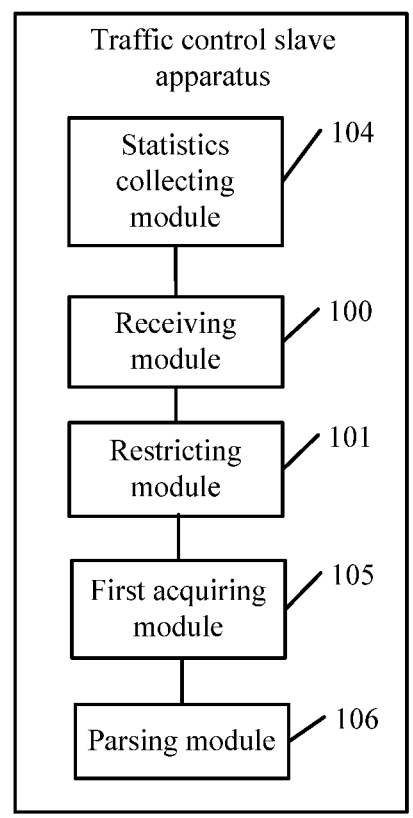
FIG. 13 is a schematic structural diagram of still another traffic control slave apparatus according to the present invention.

Referring to FIG. 13, FIG. 13 is a schematic structural diagram of still another traffic control slave apparatus according to an embodiment of the present invention. The traffic control slave apparatus may include: a receiving module 100, a restricting module 101, a statistics collecting module 104, a first acquiring module 105, and a parsing module 106, where for the receiving module 100 and the restricting module 101, reference may be made to FIG. 11, and details are not described herein again.

The statistics collecting module 104 is configured to: collect statistics about traffic used in a unit time by each application in all the applications on the slave device, and determine that an application with traffic used in a unit time exceeding a preset threshold is the preset application.

In an embodiment, a setting manner of presetting a preset application may also be that the statistics collecting module 104 on the slave device collects statistics about traffic used in a unit time by each application in all the applications on the slave device. The setting of a unit time may be specified by a user; for example, the unit time may be two minutes. It should be noted that statistics about traffic used by each application during running is collected by the statistics collecting module 104. An application with traffic used in a unit time exceeding a preset threshold is determined to be the preset application.

The first acquiring module 105 is configured to acquire the newly added information element from the beacon frame.

In an optional implementation manner, the notification message may exist in a form of a beacon frame; the master device may encapsulate the type of the network used by the master device into one newly added information element in the beacon frame; and the newly added information element may be a newly defined information element or may be an information element in an existing standard. Therefore, from a perspective of a slave device side, the first acquiring module 105 on the slave device needs to acquire, from the received beacon frame, the newly added information element including the type of the network used by the master device. A specific acquiring manner may be decapsulating the beacon frame.

The parsing module 106 is configured for the slave device to obtain, by parsing the newly added information element, the type of the network used by the master device.

In an optional implementation manner, the newly added information element includes the type of the network used by the master device; therefore, the parsing module 106 on the slave device needs to obtain, by parsing the newly added information element, the type of the network used by the master device, and may perform parsing according to a field occupied by the type of the network in the newly added information element.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 14:
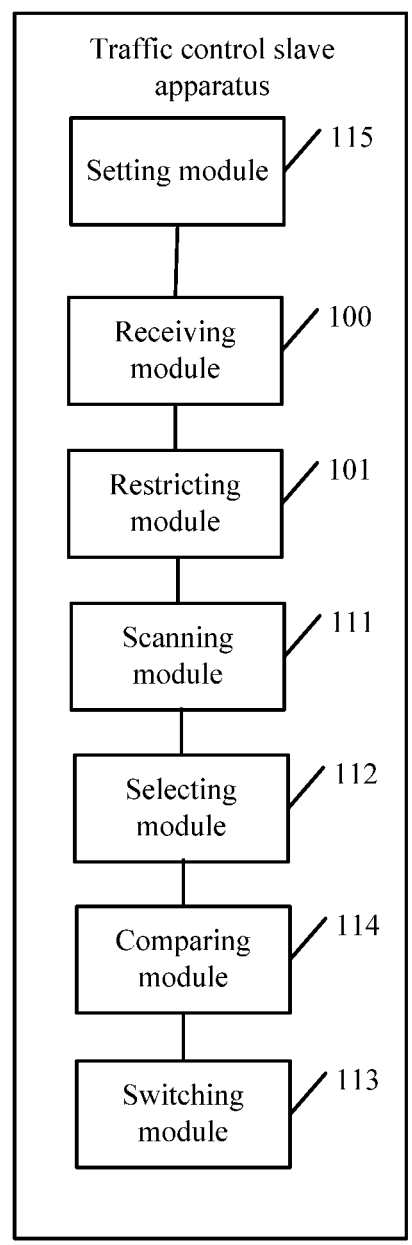
FIG. 14 is a schematic structural diagram of still another traffic control slave apparatus according to the present invention.

Referring to FIG. 14, FIG. 14 is a schematic structural diagram of still another traffic control slave apparatus according to an embodiment of the present invention. The traffic control slave apparatus may include: a receiving module 100, a restricting module 101, a scanning module 111, a selecting module 112, and a switching module 113.

The receiving module 100 is configured to receive a notification message sent by a master apparatus, where the notification message carries a type of a network used by the master device, and the type of the network includes a cellular network type or a wireless local area network type.

In an optional implementation manner, a manner in which the notification message is used to notify the type of the network used by the master device may be carrying an identifier that can represent the type of the network used by the master device; for example, the identifier may be a device type identifier. When the master device is a mobile device, the identifier can represent that the master device is a mobile Android device; for example, since the Android 4.1 version, Google has uniformly added an identifier "ANDROID_METERED". With the identifier, it can be determined whether the type of the network used by the master device is the cellular network type or the wireless local area network type. A specific determining manner may be that: when the master device is a mobile device, the master device sends its mobile device type identifier; when the slave device obtains, by means of parsing, the mobile device type identifier carried in the notification message, the slave device can determine that the type of the network used by the master device is the cellular network type; when the notification message does not carry the mobile device type identifier, the slave device can determine that the type of the network used by the master device is the wireless local area network type.

The restricting module 101 is configured to restrict use of network traffic in an application on the slave device if the type of the network used by the master device is the cellular network type.

The scanning module 111 is configured to scan whether there is another available access point.

In an optional implementation manner, after the slave device accesses the Internet by using the master device as the access point, the scanning module 111 on the slave device continues to scan whether there is another available access point. Generally, as long as the slave device is within coverage of another access point, the slave device can obtain, by means of searching, an SSID of the another access point.

The selecting module 112 is configured to: if there is another available access point, select an alternative access point from the another access point, where a type of a network used by the alternative access point is the wireless local area network type.

In an optional implementation manner, if there is another available access point, that is, the slave device obtains, by means of searching, an SSID of the another access point, the selecting module 112 on the slave device needs to select an alternative access point from the another access point, where a type of a network used by the alternative access point is the wireless local area network type.

A specific selection manner of the selecting module 112 may be determined according to a notification message delivered by the another access point. The notification message carries a type of a network used by an access point. When the slave device parses the received notification message and obtains that a type of a network used by an access point is the wireless local area network type, the slave device determines the access point as an alternative access point.

Optionally, a parsing manner of parsing the received notification message by the selecting module 112 on the slave device to obtain a type of a network used by an access point may be determining whether the notification message carries a mobile device type identifier, and when the notification message does not carry the mobile device type identifier, it may be determined that the type of the network used by the master device is the wireless local area network type.

The switching module 113 is configured to switch from the access point being the master device to the alternative access point and access the Internet by using the alternative access point.

In an optional implementation manner, to reduce use of traffic on the master device, when the slave device obtains, by means of searching, an alternative access point with a type of a used network being the wireless local area network type, the switching module 113 on the slave device switches from the previous access point being the master device to the alternative access point and accesses the Internet by using the alternative access point.

Optionally, if the alternative access point includes at least two access points, the selection may be performed according to priority sequences of all access points in the alternative access point. Therefore, this apparatus may further include:

a comparing module 114, configured to compare the priority sequences of all the access points in the alternative access point.

In an optional implementation manner, when the alternative access point includes at least two access points, that is, the slave device obtains, by means of searching at the same time, at least two access points with a type of a used network being the wireless local area network type, the comparing module 114 on the slave device needs to compare priority sequences of all access points in the alternative access point. It should be noted that the priority sequences of all the access points in the alternative access point may also be determined automatically according to signal strength of each access point; for example, an access point with strongest signal strength is automatically set to a highest priority and an access point with weakest signal strength is automatically set to a lowest priority.

The switching module 113 is specifically configured to switch from the access point being the master device to an access point with a highest priority in the alternative access point and access the Internet by using the access point with the highest priority.

In an optional implementation manner, the switching module 113 on the slave device switches from the access point being the master device to an access point with a highest priority in the alternative access point and accesses the Internet by using the access point with the highest priority. In this access point switching manner, not only traffic of the master device can be saved, but also a most appropriate access point can be selected for accessing the Internet.

Optionally, priority sequences need to be set for all access points. Therefore, this apparatus may further include:

a setting module 115, configured to set priority sequences of multiple access points, where the multiple access points include the alternative access point.

In an optional implementation manner, the slave device may obtain, by means of searching, SSIDs of multiple access points when searching for an access point. For ease of determining an access point that needs to be used, the setting module 115 needs to set priority sequences of the multiple access points on the slave device. The priority sequences may be in a high/medium/low form or an Arabic data order; for example, 1 represents a highest priority and 5 represents a lowest priority.

The setting module 115 is specifically configured to acquire priority sequences of all access points in the multiple access points, where the priority sequences are set by a user; or the setting module 115 is specifically configured to: collect, within a preset period of time, statistics about a length of use time for which the slave device uses each access point in the multiple access points, and determine priority sequences of all access points in the multiple access points according to the length of use time of each access point in the multiple access points.

In an optional implementation manner, the user may manually set the priority sequences of all the access points in the multiple access points, for example, may set a priority of an access point being a home router as a highest priority. The setting module 115 on the slave device acquires the priority sequences of all the access points in the multiple access points, where the priority sequences are set by the user.

In an optional implementation manner, a manner of setting the priority sequences by the setting module 115 on the slave device may also be an automatic learning mode, in which a behavior of using each access point by the user is tracked to perform automatic setting; for example, statistics about a length of use time for which the slave device uses each access point in the multiple access points are collected within a preset period of time and the priority sequences of all the access points in the multiple access points are determined according to the length of use time. An access point with a longest length of use time may be set to a highest priority.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 15:
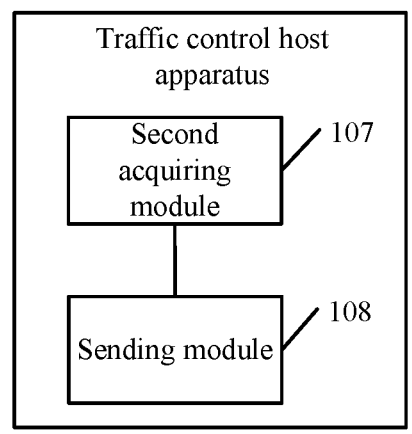
FIG. 15 is a schematic structural diagram of a traffic control master apparatus according to the present invention.

Referring to FIG. 15, FIG. 15 is a schematic structural diagram of a traffic control master apparatus according to an embodiment of the present invention. The traffic control master apparatus may include: a second acquiring module 107 and a sending module 108.

The second acquiring module 107 is configured to acquire a network type of a currently used network, where the network type includes a cellular network type or a wireless local area network type.

In an embodiment, the second acquiring module 107 on the master device acquires a network type of a currently used network. In an actual scenario, the master device may use a cellular network to access the Internet, where the cellular network may be GPRS, 3GPP, LTE or the like; or the master device may use a wireless local area network, for example, Wi-Fi, to access the Internet.

It should be noted that before the second acquiring module 107 on the master device acquires the network type of the currently used network, a data network needs to be enabled, a mobile hotspot needs to be created, a slave device accesses the Internet by using the mobile hotspot created by the master device as an access point, a notification message carrying the network type of the network used by the master device is sent to the slave device, and the slave device uses data traffic of the master device. In addition, if the master device first creates the mobile hotspot, establishes a connection to the slave device, and then enables the data network, after the data network is enabled, the master device sends, to the slave device, the notification message carrying the network type of the network used by the master device.

The sending module 108 is configured to send a notification message to the slave apparatus, where the notification message carries the network type, so that the slave apparatus restricts use of network traffic in an application on the slave device when the network type is the cellular network type, where the slave apparatus accesses the Internet by using the master apparatus as an access point.

In an embodiment, after the master device has acquired the network type of the used network, the sending module 106 needs to send the network type in a form of a notification message to the slave device. A specific sending manner may be converting the network type into information in a specific format, encapsulating the information, and sending the information to the slave device, so that the slave device controls, when the network type of the network used by the master device is the cellular network type, an application on the slave device to perform an operation corresponding to the cellular network, thereby restricting use of traffic in the application on the slave device and reducing use of traffic on the master device. Specifically, a process of encapsulating the network type by the master device may be based on the extended 802.11 standard protocol or may be based on a proprietary protocol of a vendor.

Optionally, the encapsulation of the notification message is described herein based on the extended 802.11 standard protocol. The encapsulation of the notification message may include encapsulation of information at layers of a protocol stack. As described in FIG. 1-*a*, a protocol stack structure of the network communication protocol (Transmission Control Protocol/Internet Protocol, TCP/IP) is used as an example for description. After an application layer of the master device enables a data network and creates a mobile hotspot, an MAC layer encapsulates information about the network type of the network used by the master device, for example, may encapsulate the information into a Beacon frame, and then a physical layer broadcasts the Beacon frame. A communications module, such as a wireless location area network (Wireless Local Area Network, WLAN) module, a Bluetooth module, or a USB module may control the master device to connect to the slave device. A radio frequency (Radio Frequency, RF) circuit corresponding to these communications modules specifically implements a communication function, so that wireless local area network communication, Bluetooth communication, infrared communication, or USB communication may be performed between the slave device and the master device. In this way, the slave device may receive the Beacon frame broadcasted by the master device.

Specifically, a process of encapsulating the network type may be, in the 802.11 protocol, first encapsulating the network type into a newly added information element (Information Elements, IE) and then encapsulating the newly added information element. A process of encapsulating the newly added information element may be encapsulating the newly added IE into a broadcast frame and then sending the broadcast frame to the slave device, that is, sending the notification message to the slave device. In an 802.11 frame, there are mainly three types of frame structures: data frame, control frame, and management frame. A constant bit and an information element that are included in the body of the management frame are used for transporting information. There are many types of management frames, for example, beacon (Beacon) frame, probe request (Probe Request), and probe response (Probe Response), which are separately responsible for maintenance functions at a link layer. The Beacon frame is a very important maintenance mechanism and mainly used for declaring the existence of a network. On a basic network, a Beacon frame sent regularly by an access point of a master device may allow a slave device to learn of the existence of the network and then to adjust a parameter required for joining in the network. Therefore, optionally, the newly added IE may be encapsulated into the Beacon frame.

A format of a Beacon frame includes a MAC header and a frame body. The frame body includes many mandatory and optional options (for details, reference may be made to the IEEE 802.11 standard). The newly added IE in the present invention belongs to a piece of content in the body of the Beacon frame, and no limitation is imposed on a specific location of the newly added IE in the frame format. Generally, an IE is a variable-length component of the management frame and generally includes one Element ID field, one Length field, and one field whose length is not fixed.

For the newly added IE involved in the present invention, one newly defined information element may be used or an existing information element in the 802.11 standard may be used. For example, a "Last" information element in a Beacon frame is "Vendor Specific", which is ranked $56^{th}$ currently and may be one or more. In addition, an information element used for the newly added IE may be defined by a vendor. If an existing "Last" information element is used, parameters in the information element are set. For example, Element ID may be set to 221; Organization Identifier is used to represent a network operator, for example, national China Mobile, China Unicom, and China Telecom; Vendor-specific content may be used to enumerate a network type (any name related to a network type, such as 2G, 3G, 4G, or WLAN; or GPRS, 3GPP, LTE, Wi-Fi, or the like; or UMTS, CDMA2000, WCDMA, or the like); and Length, a total length of the IE, is between 3 and 257 bytes.

It should be noted that the master device may first determine whether the network type is the cellular network type; if the network type is the cellular network type, the IE is included in the Beacon frame; if the network type is the wireless local area network, the IE does not need to be included in the Beacon frame.

Optionally, the sending module 108 is specifically configured to send the notification message to the slave apparatus according to a second preset period.

Specifically, the slave device generally works in a power saving mode and the slave device is not necessarily capable of receiving every notification message sent by the master device. Therefore, the sending module 108 on the master device sends a notification message to the slave device according to a second preset period. It should be noted that the second preset period may be the same as or may be different from a first preset period.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 16:
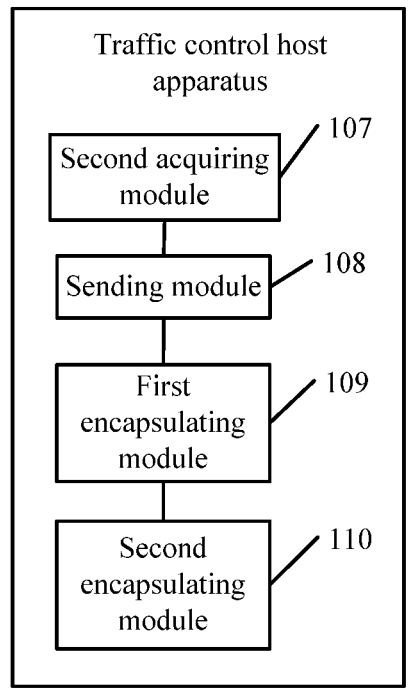
FIG. 16 is a schematic structural diagram of another traffic control master apparatus according to the present invention.

Referring to FIG. 16, FIG. 16 is a schematic structural diagram of another traffic control master apparatus according to an embodiment of the present invention. The traffic control master apparatus may include: a second acquiring module 107, a sending module 108, a first encapsulating module 109, and a second encapsulating module 110. For the second acquiring module 107 and the sending module 108, reference may be made to description in FIG. 12, and details are not described herein again.

The first encapsulating module 109 is configured to encapsulate the network type into a newly added information element, where the newly added information element is a newly defined information element or is an information element in an existing standard.

In an optional implementation manner, if encapsulation of a notification message by the first encapsulating module 109 is performing encapsulation by extending the 802.11 standard protocol, a specific process may be first encapsulating the network type into a newly added information element, where the newly added information element belongs to a piece of content in a frame body of a frame format. It should be noted that no limitation is imposed on a specific location of the newly added information element in the frame body.

The newly added information element in this embodiment may be a variable-length component of a management frame and generally includes one Element ID field, one Length field, and one field whose length is not fixed. Specifically, the newly added information element may be one newly defined information element or may be an existing information element in the 802.11 standard. For example, a "Last" information element in a Beacon frame is "Vendor Specific", which is ranked 56$^{th}$ currently and may be one or more.

The second encapsulating module 110 is configured to: encapsulate the newly added information element into a beacon frame, and determine that the beacon frame is the notification message.

In an optional implementation manner, after the first encapsulating module 109 has encapsulated the newly added information element, the second encapsulating module 110 then encapsulates the newly added information element into a beacon frame, where the beacon frame Beacon frame is a very important maintenance mechanism and mainly used for declaring the existence of a network. On a basic network, a Beacon frame sent regularly by an access point of a master device may allow a slave device to learn of the existence of the network and then to adjust a parameter required for joining in the network. Therefore, optionally, the newly added IE may be encapsulated into the Beacon frame and the beacon frame may be determined to be a notification message.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 17:
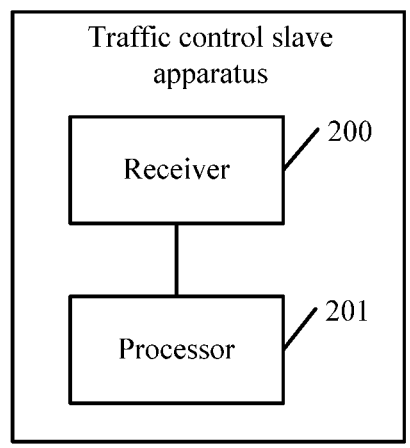
FIG. 17 is a schematic structural diagram of still another traffic control slave apparatus according to the present invention.

Referring to FIG. 17, FIG. 17 is a schematic structural diagram of still another traffic control slave apparatus according to an embodiment of the present invention. The traffic control slave apparatus may include: a receiver 200 and a processor 201.

The receiver 200 is configured to receive a notification message sent by a master apparatus, where the notification message carries a type of a network used by the master device, and the type of the network includes a cellular network type or a wireless local area network type; and the processor 201 is configured to restrict use of network traffic in an application on the slave device if the type of the network used by the master device is the cellular network type.

the slave apparatus accesses the Internet by using the master apparatus as an access point.

Optionally, encapsulation of the notification message may be implemented by extending the 802.11 standard protocol, or may be implemented by extending a proprietary protocol of a device vendor. Herein, implementation by extending the 802.11 standard protocol is used an example for description. The master device adds an information element to a beacon (Beacon) frame, where the information element includes the type of the network used by the master device, and the type of the network mainly includes a cellular network type or a wireless local area network type. It should be noted that the cellular network type is mainly 2G, 3G, 4G or general packet radio service (General Packet Radio Service, GPRS), 3GPP, Long Term Evolution technology (Long Term Evolution, LTE) or Mobile Telecommunications System (Universal Mobile Telecommunications System, UMTS), CDMA2000, Wideband Code Division Multiple Access (Wideband Code Division Multiple Access, WCDMA), or the like. The wireless local area network type is mainly WLAN, Wi-Fi, or the like. The master device sends the notification message, that is, broadcasts the Beacon frame, and the slave device receives the notification message delivered by the master device.

Specifically, a structure of the TCP/IP protocol stack, for example, the structural diagram described in FIG. 1-$a$, is used as an example for description. The slave device receives the Beacon frame through a communication channel connected to the master device. A function module that controls a connection to the master device and is in the slave device may be a communications module, such as a wireless local area network (Wireless Local Area Network, WLAN) module, a Bluetooth module, or a USB module. A radio frequency (Radio Frequency, RF) circuit corresponding to these communications modules specifically implements a communication function, so that wireless local area network communication, Bluetooth communication, infrared communication, or USB communication may be performed between the slave device and the master device. After receiving the Beacon frame that is sent by the master device and carries the type of the network used by the master device, a physical layer of the slave device sends the Beacon frame to a Media Access Control (Media Access Control, MAC) layer for parsing the Beacon frame. After the type of the network used by the master device is obtained by means of parsing, the MAC layer stores the type of the network used by the master device. In addition, authentication association is performed between the slave device and the master device, and after the authentication succeeds, the slave device establishes a connection to the master device. After the connection is established between the slave device and the master device, the MAC layer notifies an operating system at an application layer of the type of the network used by the master device. On a WLAN interface of the slave device, not only content such as signal strength, security, or encrypted or not are displayed, but also the type (for example, 3G) of the network used by the master device is displayed. Optionally, the type of the network used by the master device may not be displayed, but the type of the network used by the master device is stored and used for informing, after the connection is established, an operating system of the slave device.

Specifically, a process of performing authentication association between the slave device and the master device is as follows: A user selects the master device by using a user interface of the slave device and enters a pre-shared key; then, multiple messages are exchanged, so that the slave device and the master device separately implement authentication by using the pre-shared key; and after the authentication succeeds, a connection is established between the slave device and the master device, and the slave device and the master device separately obtain, through calculation by using the pre-shared key, an encryption key used for air interface communication.

Optionally, a manner of notifying, by the MAC layer, the operating system at the application layer of the type of the network used by the master device may be defined by the vendor, or may be implemented by a station management entity (Station Management Entity, SME). A communications interface is separately available between the SME, as the station management entity, and the MAC layer and between the SME and a driver of a Wi-Fi module. The driver is registered to the operating system of the slave device, and exchanges information with the operating system by using a message mechanism. As in the Wi-Fi protocol stack of the slave device, the MAC layer notifies, through the interface between the MAC layer and the SME and the interface between the SME and the driver of the Wi-Fi module and by using a mechanism for message exchange between the driver and the operating system, the operating system of the type of the network currently used by the master device. For example, when the cellular network type is used by the master device, the MAC layer notifies the operating system of the type (GPRS/3GPP/LTE or the like) of the network used when the master device accesses a cellular network.

Further, before the slave device receives the notification message delivered by the master device, the slave device further needs to enable a WLAN, so as to search for a network.

Optionally, when the type of the network used by the master device is the cellular network type, it indicates that traffic of the master device is limited and cannot be used without limitation. Although the wireless local area network is used on the slave device, actually, use of traffic in an application on the slave device needs to be controlled. Because the slave device uses the master device as an access point to access the Internet, traffic to be used is traffic of the master device, and the traffic of the master device is limited, the traffic to be used by the slave device needs to be controlled. For all applications on the slave device, in an application development phase, different operations that are corresponding to different network types and performed by the applications have been set. For example, if in the wireless local area network type, an application automatically performs version update; and if in the cellular network type, an application does not automatically perform version update, and when the user downloads an update, the user is reminded of traffic to be used and reminded whether to continue. Therefore, when learning that the type of the network used by the master device is the cellular network type, the slave device controls the application on the slave device to perform an operation corresponding to the cellular network type, thereby restricting use of traffic in the application on the slave device.

Specifically, when learning that the type of the network used by the master device is the cellular network type, the operating system of the slave device restricts use of network traffic in the application on the slave device. A specific restriction method may be that a control system implements automatic control. That is, the control system maintains a type of an application that consumes a relatively large amount of traffic, such as video software (for downloading a video) or an application store (for updating an application). The control system automatically disables Internet access permission of these applications. If the user manually clicks a download button, the user is reminded of an amount of traffic to be consumed and is asked whether to continue. A specific restriction method may further be that the operating system informs the application that the type of the network used by the master device is the cellular network type, so that the application runs according to a running manner set for the cellular network type. An existing application has been set to perform different operations on a cellular network and on a wireless local area network, and a current network status is a cellular network type; therefore, the application on the slave device runs according to a status corresponding to the cellular network, and consequently, use of traffic in the application on the slave device is restricted.

The processor is further configured to: if the type of the network used by the master apparatus is the cellular network type, disable a data connection of a preset application that consumes a relatively large amount of traffic and is in the application on the slave device, thereby disabling Internet access permission of the preset application and reducing use of the network traffic in the application on the slave device.

Alternatively, the processor is further configured to notify all applications on the slave apparatus if the type of the network used by the master device is the cellular network type, where content of the notification includes that the type of the network used by the master apparatus is the cellular network type, so that all the applications on the slave apparatus run according to a preset running manner corresponding to the cellular network type, thereby restricting use of the network traffic in the application on the slave apparatus.

Optionally, if the type of the network used by the master device is the cellular network type, the slave device disables a preset application that consumes a relatively large amount of traffic, where the preset application is generally an application with traffic consumed exceeding a preset threshold. When the type of the network is the cellular network type, traffic is limited; therefore, these preset applications may be disabled. It should be noted that the preset application may be video software (for downloading a video) or an application store (for updating an application or the like). An operating system disables Internet access permission of these applications. If the user manually clicks a download button, one dialog box pops up to remind the user of an amount of traffic to be consumed and ask the user whether to continue.

Optionally, after the preset application is disabled, the operating system controls another application on the slave device to perform an operation corresponding to the cellular network type, where the another application on the slave device may be an application in all applications on the slave device except the preset application. Specifically, an operation manner of the another application is an operation manner preset by a developer for the cellular network type.

Optionally, a control manner used for the slave device to control an application on the slave device to perform an operation corresponding to the cellular network type may also be that an operating system of the slave device notifies all applications on the slave device, where content of the notification includes that the type of the network used by the master device is the cellular network type, so as to remind all the applications on the slave device that the applications need to run according to a preset running manner corresponding to the cellular network type. Running manners are preset for each application for different network types. For example, in the wireless local area network type, traffic to be used by the application is not restricted, and the application automatically performs version update; and in the cellular network type, the application does not automatically perform version update. In this way, when all the applications on the slave device run according to a running manner corresponding to the cellular network type, a relatively small amount of traffic is consumed, thereby restricting use of traffic in all the applications on the slave device.

The processor is further configured to download at least one application and record type information of each of the application; and the processor is further configured to: classify the at least one application into at least one category according to the type information of each of the application, and determine that all applications in a preset category are the preset applications.

Optionally, a preset application needs to be set in advance. A specific setting manner may be that, when downloading each application, the slave device records type information of each application, where the type information may represent a type of the application. For example, the type information may be video, entertainment, or the like.

Optionally, the slave device classifies all downloaded applications into at least one category according to the type information of each application. For example, the slave device may classify an application whose type information includes video, entertainment or other information into a first traffic consumption category in which the application consumes a relatively large amount of traffic, and classify an application whose type information includes chat, text or other information into a second traffic consumption category in which the application consumes a relatively small amount of traffic.

Further, all the applications in the preset category are determined to be the preset applications. For example, the preset category may be the first traffic consumption category in which the application consumes a relatively large amount of traffic.

The processor is further configured to: collect statistics about traffic used in a unit time by each application in all the applications on the slave device, and determine that an application with traffic used in a unit time exceeding a preset threshold is the preset application.

Optionally, a setting manner of presetting a preset application may also be that the slave device collects statistics about traffic used in a unit time by each application in all the applications on the slave device. The setting of a unit time may be specified by a user; for example, the unit time may be two minutes. It should be noted that statistics about traffic used by each application during running is collected. An application with traffic used in a unit time exceeding a preset threshold is determined to be the preset application.

The notification message is a beacon frame, the type of the network used by the master device is encapsulated into a newly added information element of the beacon frame, and the newly added information element is a newly defined information element or is an information element in an existing standard;

the processor is further configured to acquire the newly added information element from the beacon frame; and the processor is further configured to obtain, by parsing the newly added information element, the type of the network used by the master device.

Optionally, the notification message may exist in a form of a beacon frame; the master device may encapsulate the type of the network used by the master device into one newly added information element in the beacon frame; and the newly added information element may be a newly defined information element or may be an information element in an existing standard. Therefore, from a perspective of a slave device side, the slave device needs to acquire, from the received beacon frame, the newly added information element including the type of the network used by the master device. A specific acquiring manner may be decapsulating the beacon frame.

Optionally, the newly added information element includes the type of the network used by the master device; therefore, the slave device needs to obtain, by parsing the newly added information element, the type of the network used by the master device, and may perform parsing according to a field occupied by the type of the network in the newly added information element.

The receiver is further configured to receive, according to a first preset period, the notification message sent by the master device.

Optionally, because the notification message that is sent by the master device to the slave device and includes a type of a network may be sent periodically, and the slave device generally works in a power saving mode in which the slave device is not necessarily capable of receiving every notification message sent by the master device, the slave device also needs to receive, according to a first preset period, the notification message sent by the master device.

The receiver is further configured to scan whether there is another available access point.

The processor is further configured to: if there is another available access point, select an alternative access point from the another access point, where a type of a network used by the alternative access point is the wireless local area network type.

The processor is further configured to switch from the access point being the master device to the alternative access point and access the Internet by using the alternative access point.

Optionally, after the slave device accesses the Internet by using the master device as the access point, the slave device continues to scan whether there is another available access point. Generally, as long as the slave device is within coverage of another access point, the slave device can obtain, by means of searching, an SSID of the another access point.

Optionally, if there is another available access point, that is, the slave device obtains, by means of searching, an SSID of the another access point, the slave device needs to select an alternative access point from the another access point, where a type of a network used by the alternative access point is the wireless local area network type.

A specific selection manner may be determined according to a notification message delivered by the another access point. The notification message carries a type of a network used by an access point. When the slave device parses the received notification message and obtains that a type of a network used by an access point is the wireless local area network type, the slave device determines the access point as an alternative access point.

Optionally, a parsing manner of parsing the received notification message by the slave device to obtain a type of a network used by an access point may be determining whether the notification message carries a mobile device type identifier, and when the notification message does not carry the mobile device type identifier, it may be determined that the type of the network used by the master device is the wireless local area network type.

Optionally, to reduce use of traffic on the master device, when the slave device obtains, by means of searching, an alternative access point with a type of a used network being the wireless local area network type, the slave device switches from the previous access point being the master device to the alternative access point and accesses the Internet by using the alternative access point.

If the alternative access point includes at least two access points, the processor is further configured to compare priority sequences of all access points in the alternative access point; and the processor is further configured to switch from the access point being the master device to an access point with a highest priority in the alternative access point and access the Internet by using the access point with the highest priority.

Optionally, when the alternative access point includes at least two access points, that is, the slave device obtains, by means of searching at the same time, at least two access points with a type of a used network being the wireless local area network type, the slave device needs to compare priority sequences of all access points in the alternative access point. It should be noted that the priority sequences of all the access points in the alternative access point may also be determined automatically according to signal strength of each access point; for example, an access point with strongest signal strength is automatically set to a highest priority and an access point with weakest signal strength is automatically set to a lowest priority.

Optionally, the slave device switches from the access point being the master device to an access point with a highest priority in the alternative access point and accesses the Internet by using the access point with the highest priority. In this access point switching manner, not only traffic of the master device can be saved, but also a most appropriate access point can be selected for accessing the Internet.

The processor is further configured to set priority sequences of multiple access points, where the multiple access points include the alternative access point.

Optionally, the slave device may obtain, by means of searching, SSIDs of multiple access points when searching for an access point. For ease of determining an access point that needs to be used, priority sequences of the multiple access points need to be set on the slave device. The priority sequences may be in a high/medium/low form or an Arabic data order; for example, 1 represents a highest priority and 5 represents a lowest priority.

A process of setting the priority sequences of the multiple access points includes:

acquiring priority sequences of all access points in the multiple access points, where the priority sequences are set by a user; or collecting, within a preset period of time, statistics about a length of use time for which the slave device uses each access point in the multiple access points, and determining priority sequences of all access points in the multiple access points according to the length of use time of each access point in the multiple access points.

Optionally, the user may manually set priority sequences of all access points in the multiple access points, for example, may set a priority of an access point being a home router as a highest priority. The slave device acquires the priority sequences of all the access points in the multiple access points, where the priority sequences are set by the user.

Optionally, a manner of setting the priority sequences by the slave device may also be an automatic learning mode, in which a behavior of using each access point by the user is tracked to perform automatic setting; for example, statistics about a length of use time for which the slave device uses each access point in the multiple access points are collected within a preset period of time and priority sequences of all access points in the multiple access points are determined according to the length of use time. An access point with a longest length of use time may be set to a highest priority.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 18:
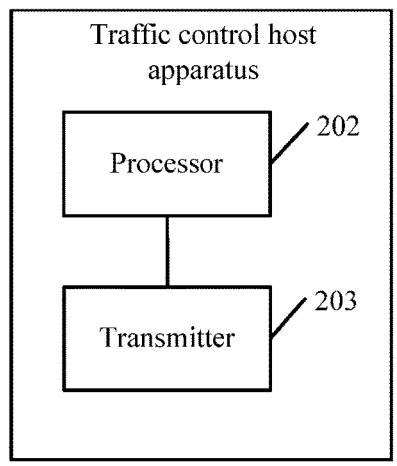
FIG. 18 is a schematic structural diagram of still another traffic control master apparatus according to the present invention.

Referring to FIG. 18, FIG. 18 is a schematic structural diagram of another traffic control master apparatus according to an embodiment of the present invention. The traffic control master apparatus may include: a processor 202 and a transmitter 203.

The processor is configured to acquire a network type of a currently used network, where the network type includes a cellular network type or a wireless local area network type; and the transmitter is configured to send a notification message to a slave apparatus, where the notification message carries the network type, so that the slave apparatus restricts use of network traffic in an application on the slave device when the network type is the cellular network type, where the slave apparatus accesses the Internet by using the master apparatus as an access point.

Optionally, the master device acquires a network type of a currently used network. In an actual scenario, the master device may use a cellular network to access the Internet, where the cellular network may be GPRS, 3GPP, LTE or the like; or the master device may use a wireless local area network, for example, Wi-Fi, to access the Internet.

It should be noted that before the master device acquires the network type of the currently used network, a data network needs to be enabled, a mobile hotspot needs to be created, the slave device accesses the Internet by using the mobile hotspot created by the master device as an access point, a notification message carrying the network type of the network used by the master device is sent to the slave device, and the slave device uses data traffic of the master device. In addition, if the master device first creates the mobile hotspot, establishes a connection to the slave device, and then enables the data network, after the data network is enabled, the master device sends, to the slave device, the notification message carrying the network type of the network used by the master device.

Optionally, after the network type of the used network is acquired, the master device needs to send the network type in a form of a notification message to the slave device. A specific sending manner may be converting the network type into information in a specific format, encapsulating the information, and sending the information to the slave device, so that the slave device controls, when the network type of the network used by the master device is the cellular network type, an application on the slave device to perform an operation corresponding to the cellular network, thereby restricting use of traffic in the application on the slave device and reducing use of traffic on the master device. Specifically, a process of encapsulating the network type by the master device may be based on the extended 802.11 standard protocol or may be based on a proprietary protocol of a vendor.

Optionally, the encapsulation of the notification message is described herein based on the extended 802.11 standard protocol. The encapsulation of the notification message may include encapsulation of information at layers of a protocol stack. As described in FIG. 1-a, a protocol stack structure of the network communication protocol (Transmission Control Protocol/Internet Protocol, TCP/IP) is used as an example for description. After an application layer of the master device enables a data network and creates a mobile hotspot, an MAC layer encapsulates information about the network type of the network used by the master device, for example, may encapsulate the information into a Beacon frame, and then a physical layer broadcasts the Beacon frame. A communications module, such as a wireless location area network (Wireless Local Area Network, WLAN) module, a Bluetooth module, or a USB module may control the master device to connect to the slave device. A radio frequency (Radio Frequency, RF) circuit corresponding to these communications modules specifically implements a communication function, so that wireless local area network communication, Bluetooth communication, infrared communication, or USB communication may be performed between the slave device and the master device. In this way, the slave device may receive the Beacon frame broadcasted by the master device.

Specifically, a process of encapsulating the network type may be, in the 802.11 protocol, first encapsulating the network type into a newly added information element (Information Elements, IE) and then encapsulating the newly added information element. A process of encapsulating the newly added information element may be encapsulating the newly added IE into a broadcast frame and then sending the broadcast frame to the slave device, that is, sending the notification message to the slave device. In an 802.11 frame, there are mainly three types of frame structures: data frame, control frame, and management frame. A constant bit and an information element that are included in the body of the management frame are used for transporting information. There are many types of management frames, for example, beacon (Beacon) frame, probe request (Probe Request), and probe response (Probe Response), which are separately responsible for maintenance functions at a link layer. The Beacon frame is a very important maintenance mechanism and mainly used for declaring the existence of a network. On a basic network, a Beacon frame sent regularly by an access point of a master device may allow a slave device to learn of the existence of the network and then to adjust a parameter required for joining in the network. Therefore, optionally, the newly added IE may be encapsulated into the Beacon frame.

A format of a Beacon frame includes a MAC header and a frame body. The frame body includes many mandatory and optional options (for details, reference may be made to the IEEE 802.11 standard). The newly added IE in the present invention belongs to a piece of content in the body of the Beacon frame, and no limitation is imposed on a specific location of the newly added IE in the frame format. Generally, an IE is a variable-length component of the management frame and generally includes one Element ID field, one Length field, and one field whose length is not fixed.

For the newly added IE involved in the present invention, one newly defined information element may be used or an existing information element in the 802.11 standard may be used. For example, a "Last" information element in a Beacon frame is "Vendor Specific", which is ranked $56^{th}$ currently and may be one or more. In addition, an information element used for the newly added IE may be defined by a vendor. If an existing "Last" information element is used, parameters in the information element are set. For example, Element ID may be set to 221; Organization Identifier is used to represent a network operator, for example, national China Mobile, China Unicom, and China Telecom; Vendor-specific content may be used to enumerate a network type (any name related to a network type, such as 2G, 3G, 4G, or WLAN; or GPRS, 3GPP, LTE, Wi-Fi, or the like; or UMTS, CDMA2000, WCDMA, or the like); and Length, a total length of the IE, is between 3 and 257 bytes.

It should be noted that the master device may first determine whether the network type is the cellular network type; if the network type is the cellular network type, the IE is included in the Beacon frame; if the network type is the wireless local area network, the IE does not need to be included in the Beacon frame.

The processor is further configured to encapsulate the network type into a newly added information element, where the newly added information element is a newly defined information element or is an information element in an existing standard; and the processor is further configured to: encapsulate the newly added information element into a beacon frame, and determine that the beacon frame is the notification message.

Optionally, if encapsulation of a notification message is performing encapsulation by extending the 802.11 standard protocol, a specific process may be first encapsulating the network type into a newly added information element, where the newly added information element belongs to a piece of content in a frame body of a frame format. It should be noted that no limitation is imposed on a specific location of the newly added information element in the frame body.

The newly added information element in this embodiment may be a variable-length component of a management frame and generally includes one Element ID field, one Length field, and one field whose length is not fixed. Specifically, the newly added information element may be one newly defined information element or may be an existing information element in the 802.11 standard. For example, a "Last" information element in a Beacon frame is "Vendor Specific", which is ranked 56th currently and may be one or more.

Optionally, after the newly added information element is encapsulated, the newly added information element is then encapsulated into a beacon frame, where the beacon frame Beacon frame is a very important maintenance mechanism and mainly used for declaring the existence of a network. On a basic network, a Beacon frame sent regularly by an access point of a master device may allow a slave device to learn of the existence of the network and then to adjust a parameter required for joining in the network. Therefore, optionally, the newly added IE may be encapsulated into the Beacon frame and the beacon frame may be determined to be a notification message.

The transmitter is further configured to send the notification message to the slave device according to a second preset period.

Optionally, the slave device generally works in a power saving mode and the slave device is not necessarily capable of receiving every notification message sent by the master device. Therefore, the master device sends a notification message to the slave device according to a second preset period. It should be noted that the second preset period may be the same as or may be different from a first preset period.

In this embodiment of the present invention, when a slave device accesses the Internet by using a master device as an access point, a notification message delivered by the master device is received, where the notification message carries a type of a network used by the master device; and the slave device restricts use of network traffic in an application on the slave device when the type of the network used by the master device is a cellular network type. In this traffic control manner, a case in which the slave device performs, when the master device uses the cellular network type, an operation corresponding to a wireless local area network type and use of network traffic in the application on the slave device is not restricted can be avoided. Therefore, traffic is saved, and an unnecessary traffic waste is reduced.

Figure 19:
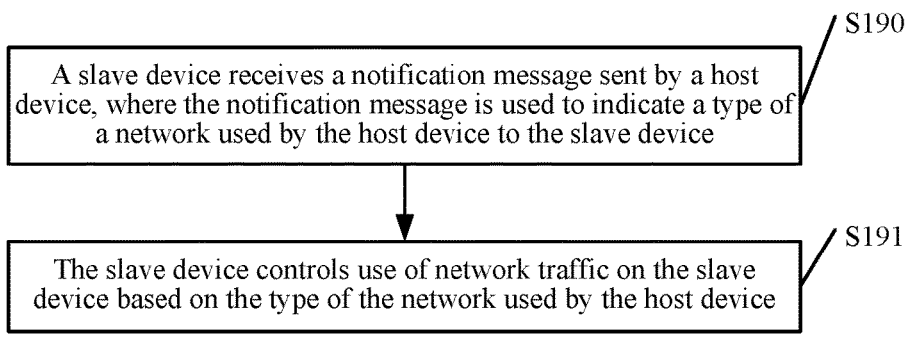
FIG. 19 is a schematic flowchart of still another traffic control method according to the present invention.

Referring to FIG. 19, FIG. 19 is a schematic flowchart of still another traffic control method according to an embodiment of the present invention. As shown in FIG. 19, the traffic control method in this embodiment includes steps S190 to S191.

S190. A slave device receives a notification message sent by a master device, where the notification message is used to indicate a type of a network used by the master device to the slave device.

In an embodiment, the slave device accesses the Internet by using the master device as an access point. The master device may send the notification message in a broadcasting manner. It may also be that the slave device sends, to the master device, a request message for requesting to be informed of the type of the network used by the master device, so as to acquire the type of the network used by the master device, and the master device delivers the notification message in response to the request message. The notification message sent by the master device is used to indicate the type of the network used by the master device to the slave device. Encapsulation of the notification message may be implemented by extending the 802.11 standard protocol, or may be implemented by extending another network protocol and no limitation is imposed herein.

An indication manner in which the notification message is used to indicate the type of the network used by the master device to the slave device may be directly encapsulating the type of the network used by the master device into the notification message, so that the slave device can obtain, after receiving the notification message, the type of the network used by the master device from the notification message. In addition, an indication manner in which the notification message is used to indicate the type of the network used by the master device to the slave device may also be encapsulating an identifier that can represent the type of the network used by the master device into the notification message, so that the slave device can obtain, by means of parsing, the type of the network by using the identifier after receiving the notification message. The identifier may be a device type identifier of the master device or a preset identifier that can represent the type of the network, and no limitation is imposed on a specific existence form of the identifier. The type of the network may include a wireless local area network type, a cellular network type, a hotspot network type, and the like, and no limitation is imposed on a specific existence form of the type of the network.

Optionally, the notification message includes a device type identifier of the master device.

After step S190, the following step S19 may further be included:

S19. The slave device obtains, according to the device type identifier of the master device, the type of the network used by the master device.

In an embodiment, when an identifier is the device type identifier of the master device, that is, the notification message includes the device type identifier of the master device, the slave device may obtain, according to the device type identifier of the master device, the type of the network used by the master device.

For example, when the master device is a mobile device, the device type identifier may represent that the master device is a mobile Android device; for example, since the Android 4.1 version, Google has uniformly added a device type identifier "ANDROID_METERED". With this device type identifier, it can be determined that the type of the network used by the master device is the cellular network type. A specific determining manner may be that: when the master device is a mobile device, the master device sends its mobile device type identifier; when the slave device obtains, by means of parsing, the mobile device type identifier carried in the notification message, the slave device can determine that the type of the network used by the master device is the cellular network type; when the notification message does not carry the mobile device type identifier, the slave device can determine that the type of the network used by the master device is the wireless local area network type.

S191. The slave device controls use of network traffic on the slave device based on the type of the network used by the master device, where the slave device accesses the Internet by using the master device as an access point.

In an embodiment, the slave device controls use of network traffic on the slave device based on the type of the network used by the master device, and specifically, the slave device controls the use of network traffic when the type of the network used by the master device is a type of a network that requires traffic consumption, for example, the cellular network type. A control manner may be disabling a data connection of a preset application, for example, a video application, that consumes a relatively large amount of traffic in an application on the slave device, or instructing all applications on the slave device to run according to a running manner corresponding to the cellular network type, for example, not performing an application update operation.

Optionally, the type of the network includes a cellular network type or a wireless local area network type.

Therefore, that the slave device controls use of network traffic on the slave device based on the type of the network used by the master device includes that:

if the type of the network used by the master device is the cellular network type, the slave device changes an identifier parameter used to represent the type of the network used by the master device to an identifier parameter used to represent the cellular network type, so that an application on the slave device acquires the identifier parameter and runs based on the identifier parameter and according to a preset running manner corresponding to the cellular network type, thereby controlling the use of network traffic in the application on the slave device.

In an embodiment, the slave device controls use of network traffic on the slave device based on the type of the network used by the master device, and specifically, if the type of the network includes a cellular network type or a wireless local area network type, when the type of the network used by the master device is the cellular network type, the slave device changes an identifier parameter used to represent the type of the network used by the master device to an identifier parameter used to represent the cellular network type, an application on the slave device acquires the identifier parameter, and when the application on the slave device detects that the identifier parameter is changed to the identifier parameter used to represent the cellular network type, use of network traffic in the application on the slave device is controlled. A specific control manner may be disabling an application that consumes a relatively large amount of traffic or controlling an application to run according to a running manner corresponding to the cellular network type, for example, not performing application update. No limitation is imposed on a specific control manner and an objective is to reduce use of network traffic on the slave device.

Figure 20:
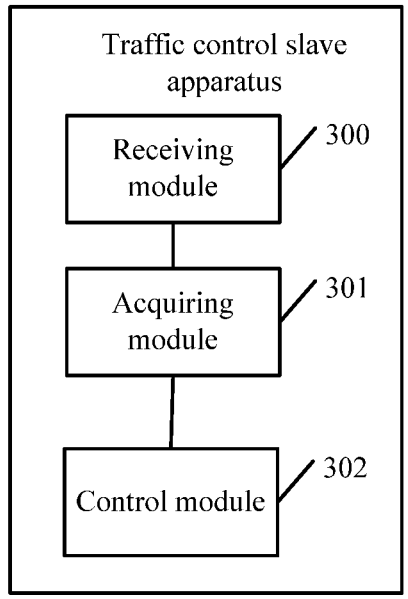
FIG. 20 is a schematic structural diagram of still another traffic control slave apparatus according to the present invention.

Referring to FIG. 20, FIG. 20 is a traffic control slave apparatus provided in an embodiment of the present invention. As shown in FIG. 20, the traffic control slave apparatus in this embodiment of the present invention may include:

a receiving module 300, configured to receive a notification message sent by a master device, where the notification message is used to indicate a type of a network used by the master device to the slave device.

In an embodiment, the slave device accesses the Internet by using the master device as an access point. The master device may send the notification message in a broadcasting manner. It may also be that the slave device sends, to the master device, a request message for requesting to be informed of the type of the network used by the master device, so as to acquire the type of the network used by the master device, and the master device delivers the notification message in response to the request message. The notification message sent by the master device is used to indicate the type of the network used by the master device to the slave device. Encapsulation of the notification message may be implemented by extending the 802.11 standard protocol, or may be implemented by extending another network protocol and no limitation is imposed herein.

An indication manner in which the notification message is used to indicate the type of the network used by the master device to the slave device may be directly encapsulating the type of the network used by the master device into the notification message, so that the receiving module 300 on the slave device can obtain, after receiving the notification message, the type of the network used by the master device from the notification message. In addition, an indication manner in which the notification message is used to indicate the type of the network used by the master device to the slave device may also be encapsulating an identifier that can represent the type of the network used by the master device into the notification message, so that the receiving module 300 on the slave device can obtain, by means of parsing, the type of the network by using the identifier after receiving the notification message. The identifier may be a device type identifier of the master device or a preset identifier that can represent the type of the network, and no limitation is imposed on a specific existence form of the identifier. The type of the network may include a wireless local area network type, a cellular network type, a hotspot network type, and the like, and no limitation is imposed on a specific existence form of the type of the network.

Optionally, the notification message includes a device type identifier of the master device, and the traffic control slave apparatus further includes: an acquiring module 301 and a control module 302.

The acquiring module 301 is configured to obtain, according to the device type identifier of the master device, the type of the network used by the master device.

In an embodiment, when an identifier is the device type identifier of the master device, that is, the notification message includes the device type identifier of the master device, the acquiring module 301 on the slave device may obtain, according to the device type identifier of the master device, the type of the network used by the master device.

For example, when the master device is a mobile device, the device type identifier may represent that the master device is a mobile Android device, for example, since the Android 4.1 version, Google has uniformly added a device type identifier "ANDROID_METERED". With this device type identifier, the acquiring module 301 can determine that the type of the network used by the master device is the cellular network type. A specific determining manner of the acquiring module 301 may be that: when the master device is a mobile device, the master device sends its mobile device type identifier; when the slave device obtains, by means of parsing, the mobile device type identifier carried in the notification message, the slave device can determine that the type of the network used by the master device is the cellular network type; when the notification message does not carry the mobile device type identifier, the slave device can determine that the type of the network used by the master device is the wireless local area network type.

The control module 302 is configured to control use of network traffic on the slave device based on the type of the network used by the master device, where the slave device accesses the Internet by using the master device as an access point.

In an embodiment, the control module 302 on the slave device controls use of network traffic on the slave device based on the type of the network used by the master device, and specifically, the control module 302 on the slave device controls the use of network traffic when the type of the network used by the master device is a type of a network that requires traffic consumption, for example, the cellular network type. A control manner may be disabling a data connection of a preset application, for example, a video application, that consumes a relatively large amount of traffic in an application on the slave device, or instructing all applications on the slave device to run according to a running manner corresponding to the cellular network type, for example, not performing an application update operation.

Optionally, the type of the network includes a cellular network type or a wireless local area network type.

The control module 302 is specifically configured to: if the type of the network used by the master device is the cellular network type, change an identifier parameter used to represent the type of the network used by the master device to an identifier parameter used to represent the cellular network type, so that an application on the slave device acquires the identifier parameter and runs based on the identifier parameter and according to a preset running manner corresponding to the cellular network type, thereby controlling the use of network traffic in the application on the slave device.

In an embodiment, the control module 302 on the slave device controls use of network traffic on the slave device based on the type of the network used by the master device, and specifically, if the type of the network includes a cellular network type or a wireless local area network type, when the type of the network used by the master device is the cellular network type, the slave device changes an identifier parameter used to represent the type of the network used by the master device to an identifier parameter used to represent the cellular network type, an application on the slave device acquires the identifier parameter, and when the application on the slave device detects that the identifier parameter is changed to the identifier parameter used to represent the cellular network type, use of network traffic in the application on the slave device is controlled. A specific control manner may be disabling an application that consumes a relatively large amount of traffic or controlling an application to run according to a running manner corresponding to the cellular network type, for example, not performing application update. No limitation is imposed on a specific control manner and an objective is to reduce use of network traffic on the slave device.

Figure 21:
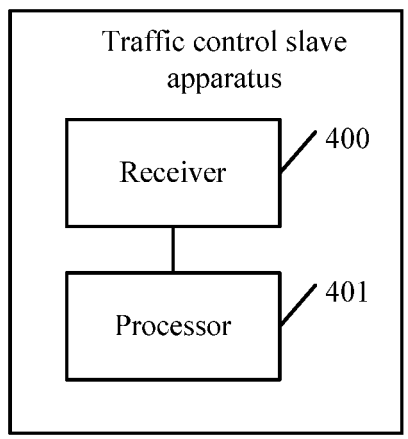
FIG. 21 is a schematic structural diagram of still another traffic control slave apparatus according to the present invention.

Referring to FIG. 21, FIG. 21 is another traffic control slave apparatus provided in an embodiment of the present invention. As shown in FIG. 21, the traffic control slave apparatus in this embodiment of the present invention may include: a receiver 400 and a processor 401.

The receiver 400 is configured to receive a notification message sent by a master device, where the notification message is used to indicate a type of a network used by the master device to the slave device; and the processor 401 is configured to control use of network traffic on the slave device based on the type of the network used by the master device, where the slave device accesses the Internet by using the master device as an access point.

Optionally, the slave device accesses the Internet by using the master device as an access point. The master device may send the notification message in a broadcasting manner. It may also be that the slave device sends, to the master device, a request message for requesting to be informed of the type of the network used by the master device, so as to acquire the type of the network used by the master device, and the master device delivers the notification message in response to the request message. The notification message sent by the master device is used to indicate the type of the network used by the master device to the slave device. Encapsulation of the notification message may be implemented by extending the 802.11 standard protocol, or may be implemented by extending another network protocol and no limitation is imposed herein.

An indication manner in which the notification message is used to indicate the type of the network used by the master device to the slave device may be directly encapsulating the type of the network used by the master device into the notification message, so that the slave device can obtain, after receiving the notification message, the type of the network used by the master device from the notification message. In addition, an indication manner in which the notification message is used to indicate the type of the network used by the master device to the slave device may also be encapsulating an identifier that can represent the type of the network used by the master device into the notification message, so that the slave device can obtain, by means of parsing, the type of the network by using the identifier after receiving the notification message. The identifier may be a device type identifier of the master device or a preset identifier that can represent the type of the network, and no limitation is imposed on a specific existence form of the identifier. The type of the network may include a wireless local area network type, a cellular network type, a hotspot network type, and the like, and no limitation is imposed on a specific existence form of the type of the network.

Optionally, the slave device controls use of network traffic on the slave device based on the type of the network used by the master device, and specifically, the slave device controls the use of network traffic when the type of the network used by the master device is a type of a network that requires traffic consumption, for example, the cellular network type. A control manner may be disabling a data connection of a preset application, for example, a video application, that consumes a relatively large amount of traffic in an application on the slave device, or instructing all applications on the slave device to run according to a running manner corresponding to the cellular network type, for example, not performing an application update operation.

The notification message includes a device type identifier of the master device.

The processor is further configured to obtain, according to the device type identifier of the master device, the type of the network used by the master device.

Optionally, when an identifier is the device type identifier of the master device, that is, the notification message includes the device type identifier of the master device, the slave device may obtain, according to the device type identifier of the master device, the type of the network used by the master device.

For example, when the master device is a mobile device, the device type identifier may represent that the master device is a mobile Android device; for example, since the Android 4.1 version, Google has uniformly added a device type identifier "ANDROID_METERED". With this device type identifier, it can be determined that the type of the network used by the master device is the cellular network type. A specific determining manner may be that: when the master device is a mobile device, the master device sends its mobile device type identifier; when the slave device obtains, by means of parsing, the mobile device type identifier carried in the notification message, the slave device can determine that the type of the network used by the master device is the cellular network type; when the notification message does not carry the mobile device type identifier, the slave device can determine that the type of the network used by the master device is the wireless local area network type.

The type of the network includes a cellular network type or a wireless local area network type.

The controlling use of network traffic on the slave device based on the type of the network used by the master device includes:

if the type of the network used by the master device is the cellular network type, changing an identifier parameter used to represent the type of the network used by the master device to an identifier parameter used to represent the cellular network type, so that an application on the slave device acquires the identifier parameter and runs based on the identifier parameter and according to a preset running manner corresponding to the cellular network type, thereby controlling the use of network traffic in the application on the slave device.

Optionally, the slave device controls use of network traffic on the slave device based on the type of the network used by the master device, and specifically, if the type of the network includes a cellular network type or a wireless local area network type, when the type of the network used by the master device is the cellular network type, the slave device changes an identifier parameter used to represent the type of the network used by the master device to an identifier parameter used to represent the cellular network type, an application on the slave device acquires the identifier parameter, and when the application on the slave device detects that the identifier parameter is changed to the identifier parameter used to represent the cellular network type, use of network traffic in the application on the slave device is controlled. A specific control manner may be disabling an application that consumes a relatively large amount of traffic or controlling an application to run according to a running manner corresponding to the cellular network type, for example, not performing application update. No limitation is imposed on a specific control manner and an objective is to reduce use of network traffic on the slave device.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), a random access memory (Random Access Memory, RAM), or the like.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A mobile communication system comprising:
   a first wireless mobile user device and a second wireless mobile user device, the first wireless mobile user device being configured to:
   connect to the internet through an access network;
   establish a short-range wireless communication channel with the second wireless mobile user device;
   receive data from the internet through the access network;
   forward the data from the internet to the second wireless mobile user device through the short-range wireless communication channel;
   send a notification message to the second wireless mobile user device through the short-range wireless communication channel, wherein the notification message includes a device type identifier of the first wireless mobile user device;
   the second wireless mobile user device being configured to:
   connect to the first wireless mobile user device through the short-range wireless communication channel;
   receive the data from the internet via the first wireless mobile user device;
   receive the notification message from the first wireless mobile user device;
   get the device type identifier of the first wireless mobile user device from the notification message; and
   restrict network traffic between the second wireless mobile user device and the internet according to the device type identifier.

2. The mobile communication system according to claim 1, wherein the second wireless mobile user device is configured to run multiple applications, and
   wherein restricting network traffic by the second wireless mobile user device comprises: notifying the multiple applications regarding the device type identifier for each the multiple applications to restrict network traffic of said each application according to the device type identifier.

3. The mobile communication system according to claim 1, wherein the second wireless mobile user device is further configured to display the device type identifier.

4. A wireless mobile user device, comprising:
   a short-range wireless communication transceiver;
   a memory storing computer-executable instructions; and
   a processor configured to execute the computer-executable instructions to perform operations comprising:
   establishing, using the short-range wireless communication transceiver, a short-range wireless communication channel between the wireless mobile user device and a slave device;
   connecting to the internet through an access network;
   receiving data from the internet for the slave device;
   forwarding the data received from the internet to the slave device via the short-range wireless communication channel;
   sending a notification message to the slave device through the short-range wireless communication channel, wherein the notification message includes a device type identifier of the wireless mobile user device.

5. The wireless mobile user device according to claim 4 wherein the notification message instructs the slave device to restrict network traffic between the slave device and the internet according to the device type identifier.

6. The wireless mobile user device according to claim 4, wherein the notification message is a beacon frame.

7. The wireless mobile user device according to claim 4, wherein the short-range wireless communication channel is a Wi-Fi channel and the access network is a cellular network.

8. A method performed by a wireless mobile user device for traffic control, comprising:
   establishing a short-range wireless communication channel with a slave device;
   connecting to the internet through an access network;
   receiving data from the internet for the slave device;
   forwarding the data received from the internet to the slave device via the short-range wireless communication channel; and
   sending a notification message to the slave device through the short-range wireless communication channel, wherein the notification message includes a device type identifier of the wireless mobile user.

9. The method according to claim 8, wherein the notification message instructs the slave device to restrict network traffic between the slave device and the internet according to the device type identifier.

10. The method according to claim 8, wherein the notification message is a beacon frame.

11. The method according to claim 8, wherein the short-range wireless communication channel is a Wi-Fi channel and the access network is a cellular network.

* * * * *

UNITED STATES PATENT AND TRADEMARK OFFICE
CERTIFICATE OF CORRECTION

PATENT NO. : 10,375,598 B2
APPLICATION NO. : 16/038510
DATED : August 6, 2019
INVENTOR(S) : Wang et al.

It is certified that error appears in the above-identified patent and that said Letters Patent is hereby corrected as shown below:

In the Specification

In Column 11, Line 13, delete "invention." and insert -- invention; --, therefor.

In Column 12, Line 7, delete "step S101." and insert -- S101. --, therefor.

In Column 14, Line 48, delete "step S201." and insert -- S201. --, therefor.

In Column 15, Line 62, delete "step S301." and insert -- S301. --, therefor.

In Column 16, Line 59, delete "step S403." and insert -- S403. --, therefor.

In Column 17, Line 57, delete "step S502." and insert -- S502. --, therefor.

In Column 18, Line 42, delete "step S603." and insert -- S603. --, therefor.

In Column 19, Line 35, delete "step S704." and insert -- S704. --, therefor.

In Column 21, Line 3, delete "step S806." and insert -- S806. --, therefor.

In Column 22, Line 49, delete "step S901." and insert -- S901. --, therefor.

In Column 24, Line 64, delete "step S1003." and insert -- S1003. --, therefor.

In Column 26, Line 50, delete "Proble" and insert -- Probe --, therefor.

Signed and Sealed this
Fifteenth Day of November, 2022

Katherine Kelly Vidal
*Director of the United States Patent and Trademark Office*

In the Claims

In Column 55, in Claim 1, Line 34, delete "system" and insert -- system, --, therefor.

In Column 56, in Claim 5, Line 31, delete "4" and insert -- 4, --, therefor.